United States Patent

[11] 3,599,867

[72] Inventors David E. Griswold
 Corona Del Mar;
 Jonathan D. Likins, Costa Mesa, both of, Calif.
[21] Appl. No. 875,658
[22] Filed Nov. 12, 1969
[45] Patented Aug. 17, 1971
[73] Assignee Griswold Controls
 Santa Ana, Calif.

[54] MODULAR IRRIGATION CONTROL SYSTEM
 16 Claims, 26 Drawing Figs.
[52] U.S. Cl. ................................................. 239/63, 239/70
[51] Int. Cl. ........................................................ A01g 25/00
[50] Field of Search ........................................... 239/63, 70

[56] References Cited
 UNITED STATES PATENTS
 2,821,434 1/1958 Hunter et al. .................. 239/63 X
 2,989,667 6/1961 Swink ........................... 239/63 X
 3,063,643 11/1962 Roberts ......................... 239/70
 3,440,434 4/1969 Yates et al. .................... 239/70
 3,524,471 8/1970 Bresser ......................... 239/70 X Primary Examiner—Lloyd L. King
Attorney—Fowler, Knobbe & Martens ABSTRACT: A central control unit generates starting signals which are distributed to a number of remote zone control units, each of which is programmed successively to actuate selected ones of a respective set of valves in accordance with a preselected schedule. A chain of zone control units may be triggered in succession, each by a signal from the preceding such unit, to carry out its assigned schedule when the schedule assigned to the preceding zone control unit has been completed.

Both the central and the zone control units are made to respond automatically and positively to various events such as a power failure, rain, excessive ground moisture, and the actuation of the valves. A simple method of sending signals in both directions between a central control unit and a zone control unit over a single pair of wires is also provided to actuate the system components remotely.

INVENTORS.
DAVID E. GRISWOLD
JONATHAN D. LIKINS
BY
FOWLER, KNOBBE
& MARTENS
ATTORNEYS.

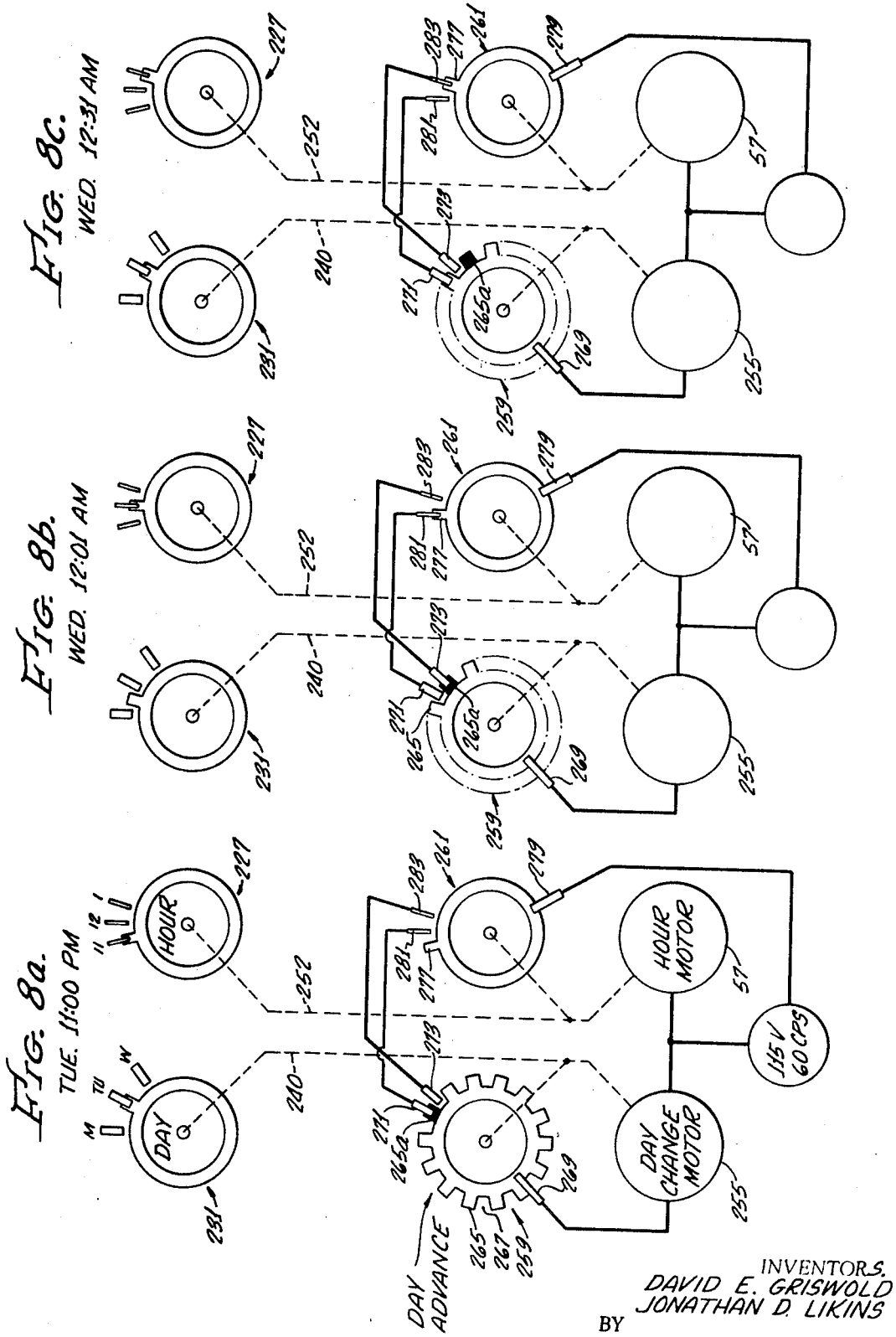

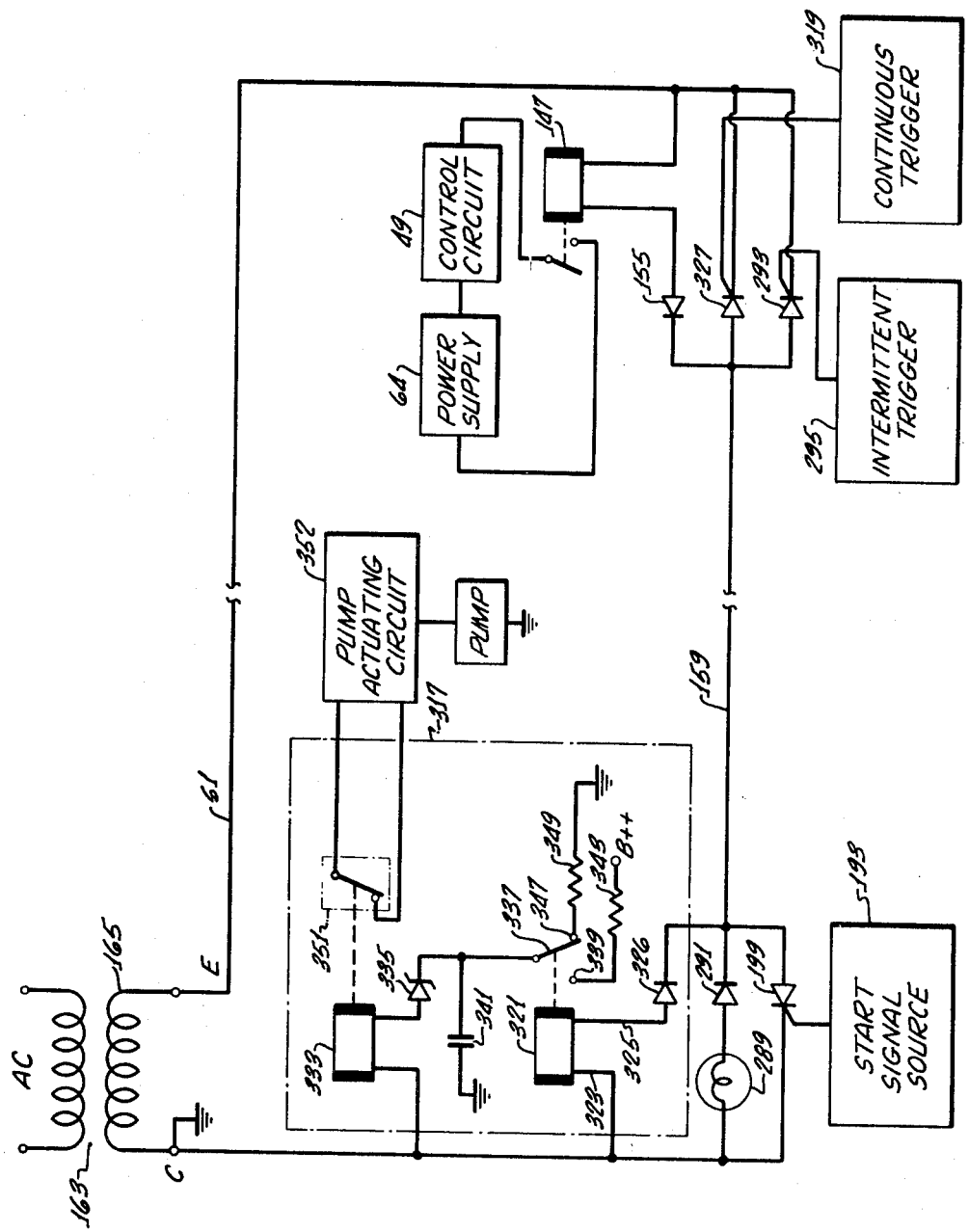

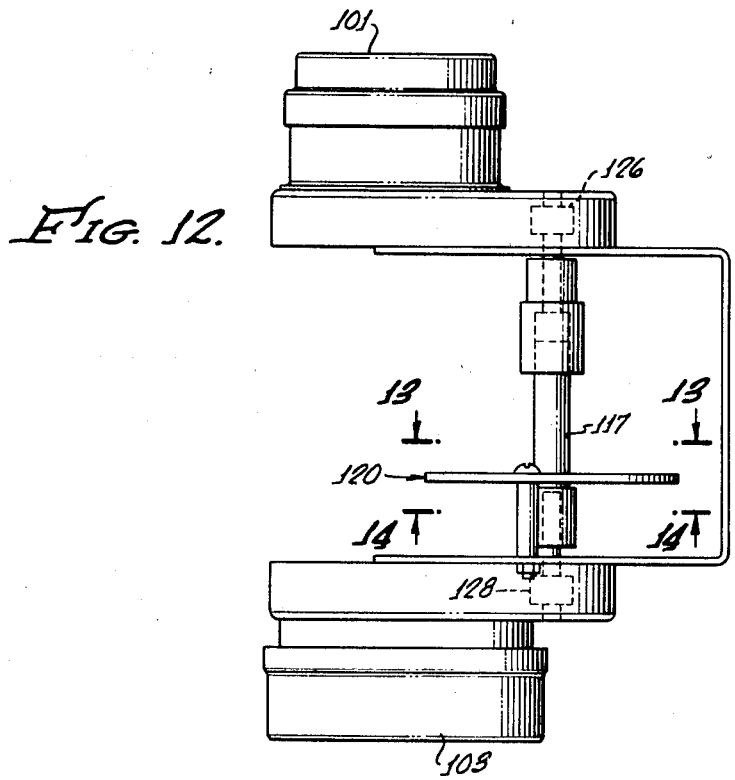
Fig. 12.
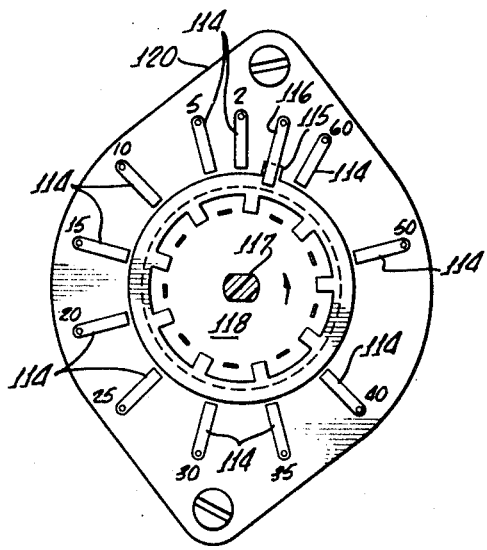
Fig. 13.
Fig. 14.

MODULAR IRRIGATION CONTROL SYSTEM

TABLE OF CONTENTS

|   |   |
|---|---|
| A. ABSTRACT OF THE DISCLOSURE | Col. Pg. 1 |
| B. BACKGROUND OF THE INVENTION | 1 |
| C. SUMMARY OF THE INVENTION | 1 |
| D. BRIEF DESCRIPTION OF THE DRAWINGS | 3 |
| E. DESCRIPTION OF AN EXEMPLARY SYSTEM INCORPORATING THE INVENTION | 4 |
|   1. Typical Application of the System | 4 |
|   2. Possibilities of the Series Start Feature | 5 |
|   3. Selecting a Particular Set of Schedules and Schedule Starting Times | 6 |
|   4. Organization and Operation of the Exemplary System | 7 |
|     (a) Introduction | 7 |
|     (b) The Control Section of the Zone Control Unit | 7 |
|       (1) In General | 7 |
|       (2) Stepping the Valve Control Wafer Switch | 8 |
|       (3) Producing a Variable Delay for Stepping the Switch | 9 |
|       (4) Initiating a Schedule in Response to a Starting Signal | 12 |
|     (c) The Starting Signal Generator of the Central Control Unit | 13 |
|       (1) In General | 13 |
|       (2) Shaping the Starting Signal | 14 |
|       (3) Timing the Starting Signal | 15 |
|       (4) Driving the Day and Hour Index Wafer Switches | 16 |
|     (d) Information Feedback | 17 |
|     (e) Schedule Abort | 21 |
|     (f) The Tensiometer Circuit | 22 |
|     (g) Moisture Cut Off | 23 |
|     (h) The Rain Cut Off Circuit | 24 |
|     (i) The Series Start Circuit | 24 |

B. BACKGROUND OF THE INVENTION

The present invention is directed to controlling the irrigation of large areas, such as golf courses. The areas which need to be controlled vary considerably. Thus, controls of different sizes and complexities are required in different locations, depending upon the size and complexity of the area which is to be irrigated. This variation makes it difficult to mass-produce controls due to the need to manufacture and merchandize controls having different capabilities. A useful technique which permits taking advantage of the economies of mass production is to modularize the control so that changes in the magnitude of jobs can be accommodated by increasing the number of modules rather than by increasing the size and complexity of the control itself.

One approach to modularizing an irrigation control is to use a single central control unit and a large number of remote zone control units, all of which are actuated concurrently by a single starting signal from the central control unit. Thus, at selected times during each day, all of the remote control units can be actuated, and they in turn actuate their associated group of valves in succession. This technique has the disadvantage that all of the valves are turned on at the same time, at least when the remote zone control units are initially actuated and therefore a very heavy demand is made on the supply of water to the valves. Thus, to a certain extent, the economy that has been gained through modularization of controls is lost by the need to increase the size of the water conduit which is run to the valves.

C. SUMMARY OF THE INVENTION

The water supply problem referred to above is not inherent when a single central control unit is used because its outputs can be serialized, so that the several valves in the field are turned on in succession. A typical system of this type is described in Yates U.S. Pat. No. 3,440,434.

The water supply problem is inherent in the modular approach because usually only one control channel is run from the central control unit to all of the remote zone control units so that, as successive starting signals are sent out, all of them are turned on in unison. Thus, at least initially, all of the remote valves draw water at the same time. In accordance with an important feature of the present invention, a plurality of remote zone control units are actuated in response to starting signals from a central control unit. However, only a portion of them are turned on directly by the starting signals from the central unit, and therefore only those valves which are controlled by that portion of the remote units draw power at the same time. This initially actuated group of zone control units in turn actuates a subsequent or second group of zone control units when members of the first group have completed actuating their associated valves. In this way, even though only a few wires are run from the central control unit to the zone control units, and thus a large saving in wire costs is effected, this saving, as well as the saving effected through modularization is not achieved at the cost of excessive demands being placed on the water supply.

In keeping with this aspect of the invention, the central control unit generates starting signals at selected hours of selected days. Zone control units are arranged in one or more chains, with each chain including at least two individual zone control units, each responsive to a starting signal successively to actuate selected ones of a respective set of valves for selected periods of time in accordance with a preselected schedule and each zone control unit generating a starting signal when the selected actuation of the last of its associated set of valves has been completed. The first zone control unit in each chain receives a starting signal from the central control unit and subsequent zone control units in each chain are made to receive the starting signal produced by the immediately preceding zone control unit in the chain. In this way, successive zone control units and their associated valves in each chain are actuated in response to the completion of a schedule by the preceding zone control unit in that chain.

In accordance with another feature of the invention, a zone control unit includes a switching device which is initially advanced by a locally generated control signal in response to a remotely generated starting signal so as to advance the switching means to the first of a series of states, or positions, in which it is operative to actuate the first of its associated set of valves for a selected period of time. The switching means is then advanced through the remaining ones of its intermediate states or positions by means of a timing device which is operative to leave the switching means at each of its intermediate states for a preselected period of time. This arrangement permits the remotely located zone control unit to execute its particular schedule independently from the central control unit, except for the initial starting signal which sets the zone control unit into operation. In accordance with yet another feature of the invention, the starting signal is blocked after it has set the zone control unit into operation so as to prevent the same starting signal from triggering the zone control unit more than once.

The schedule of operations which the zone control unit is capable of executing in response to a single starting signal is made quite extensive and flexible by means of another feature of the invention, whereby a schedule is made to include several cycles of valve actuation separated by delay periods. Respective ones of the valves associated with a given zone control unit are actuated successively during each of the several cycles and the length of time during which a given valve is actuated may be made different during each of the different cycles. The delay periods between cycles are also made variable so as to allow the water which has been dispensed during the preceding cycle to be absorbed in the ground. Optionally, a zone control unit may have associated with it a moisture-sensing device which is operative to terminate a schedule which is in progress in response to excessive moisture in the ground. In keeping with this optional feature of the invention, this can occur only during one of the delay periods between cycles so as to insure that all of a given zone covered by a particular set of valves is approximately equally watered, which would not be the case if a cycle were terminated after the actuation of only a portion of the total number of valves associated with the zone control unit.

In accordance with yet another feature of the invention, a schedule which is in progress is also terminated when power to the zone control unit is temporarily interrupted. This termination of a schedule in progress occurs automatically when power returns and makes possible the termination of a schedule in progress at any time that this is desired by interrupting the supply of power to the zone control unit from the central control unit, a feature which is also provided.

In addition to making the zone control units responsive to signals from the central control unit, means are also provided for making the central control unit responsive to signals fed back to it from the zone control units. Specifically, in keeping with this aspect of the invention, the irrigation system is supplied with water under pressure by means of a central pump which is controlled by the central control unit in response to signals sent to it from the zone control units, these signals indicating that a valve has been actuated. In this way, the central pump is on only when it needs to be on, that is when one of the valves to which water is to be supplied has been opened. At all other times the central pump may be turned off. Actually, in the case where a schedule is in progress and several valves are actuated in succession, it becomes undesirable to turn off the water pump during the very brief intervals between the actuation of the valves, these intervals being due to the finite time required for the switching device in the zone control unit to advance from a given one of its states to the next. Accordingly, means are provided in the zone control units to simulate the presence of a load similar to the electrical circuits of the valves during the switching intervals so as to keep the pump actuated continuously during a schedule.

It is an important feature of the present invention that the starting signals sent from the central control unit to the zone control units and the pump control signals sent from a given zone control unit back to the central control unit are transmitted over a single pair of wires. The manner in which the bidirectional transmission of signals on a single pair of wires is achieved is the sole invention of Jonathan D. Likins and is covered in a copending application filed by him and assigned to the assignee of the present application. However, the combination of the method of signal transmission and the irrigation system disclosed herein is the joint invention of David E. Griswold and Jonathan D. Likins and is claimed in the present application. In accordance with this feature of the invention, signals are transmitted in both directions between a central control unit and a given zone control unit over a pair of wires. An alternating current source in the central control unit is connected in series with one of the wires. Both the central control unit and the zone control unit is provided with means for sensing current flow through the wires in a respective one of mutually opposite directions. Also providing in each unit is a switching means for completing a respective circuit through the wires and through the sensing means in the other unit, the circuit completed by the switching means in a given unit being capable of carrying current only in the direction sensed by a sensing means in the other unit. A starting signal is produced in the central control unit by means which closes the switching means in that unit at selected hours of selected days. This completes a circuit through the sensing means in the zone control unit which also includes means for successively actuating its valves in accordance with a preset schedule in response to the detection of current by its sensing means. The zone control unit also includes means for closing its switching means while any of the valves controlled by the zone control unit is being actuated. Closure of this switching means completes a circuit through the sensing means in the central control unit, which additionally includes means for actuating the central pump in response to the detection of current by its sensing means.

D. BRIEF DESCRIPTION OF THE DRAWINGS

Figure 10:
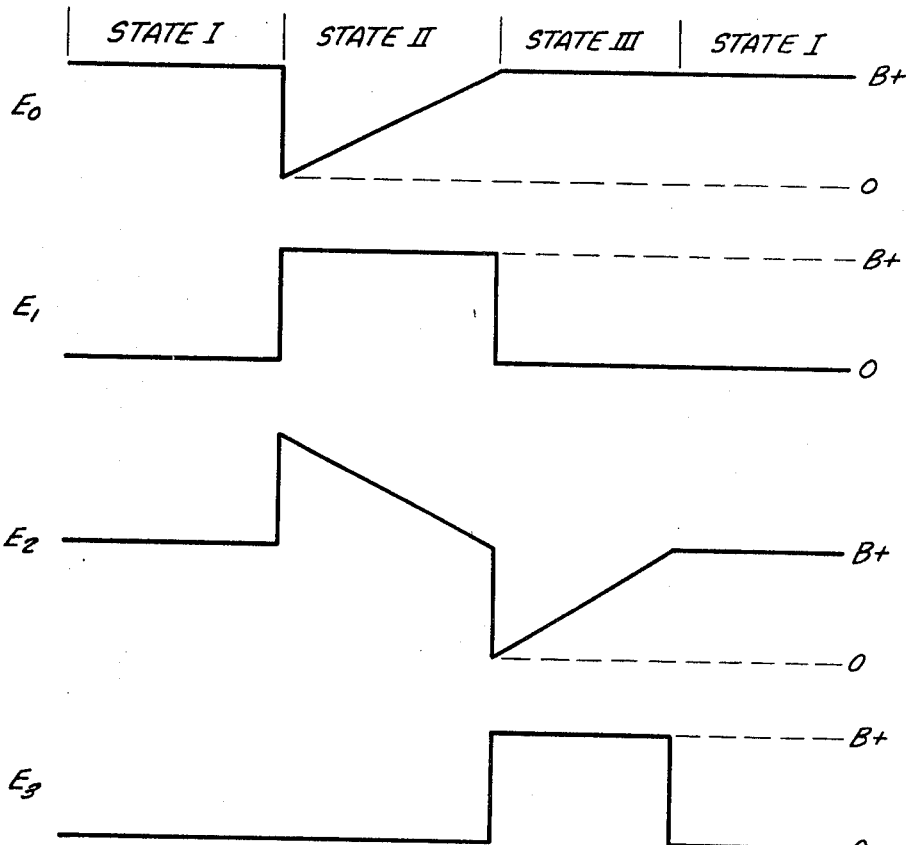
Figure 11:
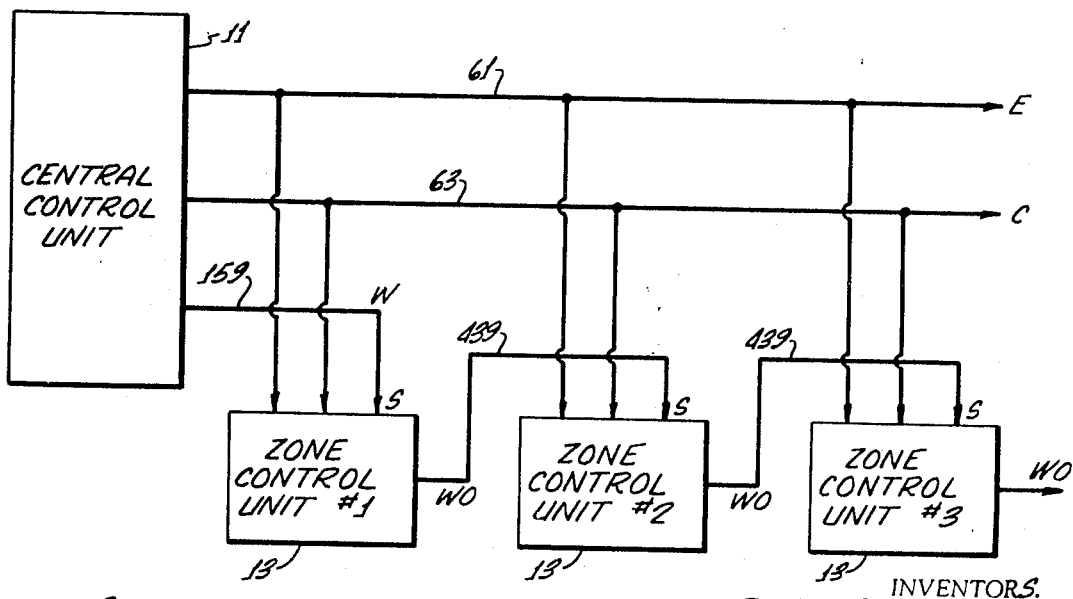

FIGS. 8a, 8b, and 8c illustrate the operation of the motor control portion of the central control unit whereby the day change motor is caused to advance by one day at midnight;

FIG. 9 is a schematic diagram of a signal transmission system including signal sensing and transmitting means in each of the central and zone control units for transmitting information between the units in opposite directions;

FIG. 10 is a series of waveforms to illustrate the operation of a circuit in the zone control unit which serves to generate a starting signal when the schedule selected for that zone control unit has been completed;

FIG. 11 is a block diagram to illustrate the wiring between the central control unit and a series of zone control units in a chain of such units;

FIG. 12 is a side elevation of an assembly in the zone control unit which is used to time the successive actuation of valves by the unit;

FIG. 13 is a plan view taken along line 13-13 of FIG. 12 and illustrating one side of a wafer switch forming part of the timing assembly shown in FIG. 12;

FIG. 14 is a view of the same wafer switch taken along line 14-14 of FIG. 12 to illustrate that part of the switch which is used to control the resetting of the timing assembly.

E. DESCRIPTION OF AN EXEMPLARY SYSTEM INCORPORATING THE INVENTION

1. Typical Application of the System

Figure 1:
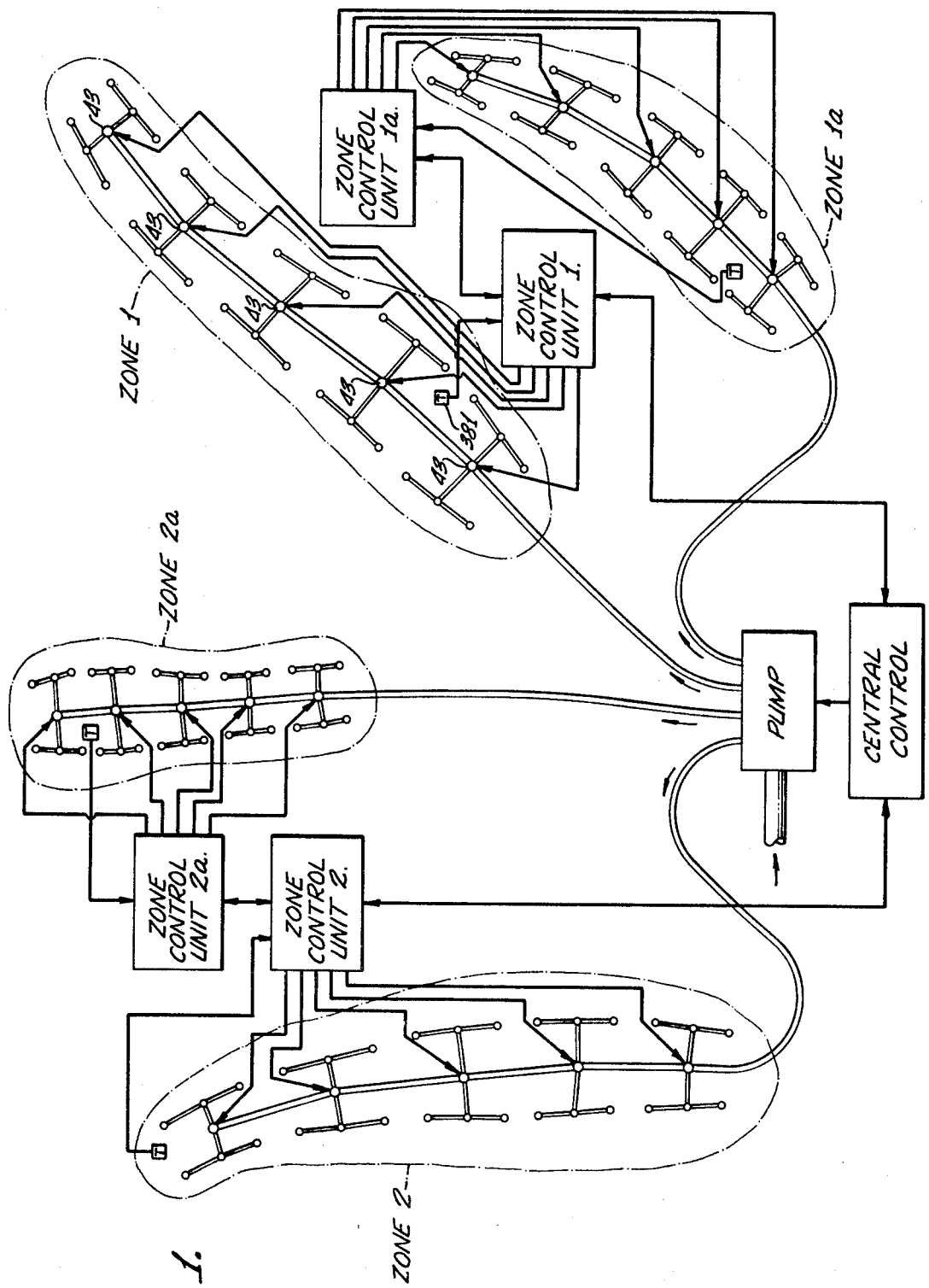
FIG. 1 illustrates a system comprising a central control unit and two chains of zone control units and their physical arrangement for controlling the irrigation of two remote zones or areas such as those which might be found at a golf course.

The general layout of an area whose irrigation might be controlled by the system of the present invention, is shown in FIG. 1. It is shown to comprise a number of zones, such as zones 1 and 1a and zones 2 and 2a, with the irrigation of each zone being controlled by an individual zone control unit which is physically located near the zone which it controls and remotely from a single central control unit which, in the case of a golf course, would usually be located near the club house. Also near the central control unit is a pump from which water lines extend to the valves at the various zones. Referring to zone 1 in particular, it is seen to be irrigated through a number of sprinklers which are arranged in five stations. Each station comprises a number of individual sprinklers which are controlled by means of a single valve which receives actuating signals from the zone control unit associated with zone 1. Zone control units 1, which serves to control the valves associated with the five stations of zone 1, is connected through a set of wires to the central control unit and it is over this set of wires that a starting signal is sent from the central control unit to the zone control unit 1 at selected hours of selected days. The zone control unit causes successive ones of the five valves at the five stations of zone 1 to be actuated serially for selected periods of time in accordance with a preselected schedule.

The zone control unit 1 is also connected to the zone control unit 1a through a set of wires so that the latter zone control unit may be triggered by a starting signal generated by zone control unit 1 when that zone control unit has completed its assigned schedule of operations. When this occurs, the set of valves located in zone 1a is actuated in a similar manner to that described with reference to zone 1 under the control of zone control unit 1a.

A moisture-sensing device, called a tensiometer and labeled T in FIG. 1, may be optionally provided to terminate a watering schedule being run by the zone control unit 1 if there is excessive moisture in zone 1. This will also serve to keep the zone control unit 1a from initiating its assigned schedule.

Normally, at a selected hour of a selected day a starting signal is sent to zone control unit 1, and in response to that signal the valves at the five stations of zone 1 are successively actuated through one or more cycles in accordance with a schedule set up on the zone control unit. When this schedule is completed, a starting signal is sent from zone control unit 1 to zone control unit 1a and the valves at the stations located in zone 1a are similarly actuated in accordance with the schedule under the control of zone control unit 1a. In a similar manner, a starting signal is sent by the central control unit independently to zone control unit 2 so that the valves in zone 2 and the valves in zone 2a are sequentially actuated under the control of the chain which includes zone control units 2 and 2a. Information is sent back from all of the zone control units to the central control unit at all times to indicate the actuation of any valve in the zones shown.

The central control unit actuates the pump station whenever it receives a signal from the zone control units, indicating that a valve has been actuated. It will be noted that, by placing the zone control units near the zones which they control, a significant saving in wire length is achieved over the type of system in which each of the valves is connected by wires to a single central control unit. Moreover, a saving in wire length is also achieved over that type of a system in which zone control units are used, but in which each of the zone control units is connected individually to a single central control unit. Moreover, it is seen that as a result of the "chain" concept, under which several zone control units are actuated in succession, each in response to a signal from a previous one in the chain, the simultaneous actuation of a large number of valves is avoided, thereby permitting the use of a smaller pump and smaller conduits leading to and from the pump. Thus, the system of the present invention serves not only to reduce system cost by modularization, it also serves to reduce the cost of electrical and hydraulic connections.

2. Possibilities of the Series Start Feature

Figure 2:
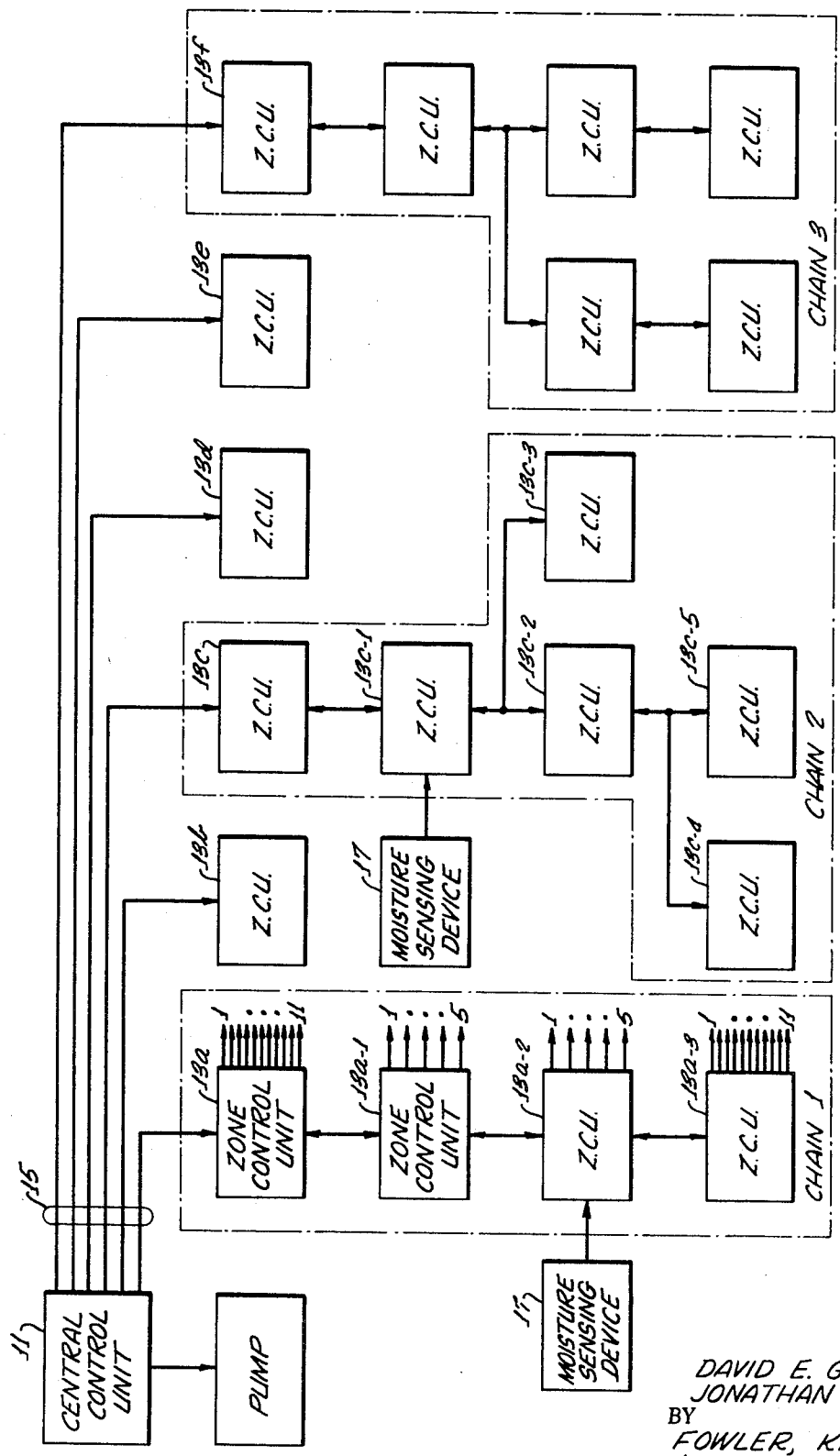
FIG. 2 is a block diagrammatic representation of a central control unit and several chains of zone control units to show the variety of arrangements which can be achieved with the system of the present invention.

The irrigation system shown in FIG. 1 is a very simple example of what may be achieved with the series start feature, whereby successive zone control units in a chain are each actuated by the preceding zone control unit in that chain. FIG. 2 illustrates, in block form only, a more complex system to give a further illustration of how such a system and its components may be arranged. It is seen to comprise a central control unit 11 and a number of zone control units 13, each of which receives a starting signal over an individual one of six output lines 15 from the central control unit 11. Of the first of the zone control units, 13a is part of a chain of four serially connected zone control units, the first and last of which each have 11 outputs, successively to actuate 11 valves and the second and third of which each have five outputs, similarly to actuate five control valves as shown in FIG. 1. The third control unit in the chain is associated with a moisture-sensing device 17 so that the watering schedule controlled by it and by the subsequent zone control unit may be terminated in response to excessive ground moisture sensed by the device 17. The second zone control unit, 13b in the top row is not part of a chain and is the only such unit actuated either directly or indirectly as a result of a starting signal on the second of the output lines 15 from the central control unit 11.

The third of the output lines 15 is connected to apply a starting signal to a zone control unit 13c which is part of a chain having two zone control units 13c and 13c–1 connected to operate in series succession. Additionally, two zone control units 13c–2 and 13c–3 are connected to the output of the second zone control unit 13c–1 to initiate their respective schedules in response to a starting signal from that unit. Finally, two more zone control units, 13c–4 and 13c–5 are connected to initiate their respective schedules in response to a starting signal from the zone control unit 13c–2. The arrangement of the other zone control units in FIG. 2 is self-evident and will not be described further. It will be noted that a single start signal from the central control unit 11 may be operative to initiate a single schedule, as in the case of the zone control unit 13b. Alternatively, the central control unit 11 may be operative to initiate the execution of a large number of schedules. Each of these schedules may occur by itself after a preceding schedule has been executed, as in the case of the chain including the zone control units 13a through 13a–3. Alternatively, two or more schedules may be in progress at the same time, as in the case of the zone control units 13c–2 and 13c–3.

3. Selecting a Particular Set of Schedules and Schedule-Starting Times

Figure 3:
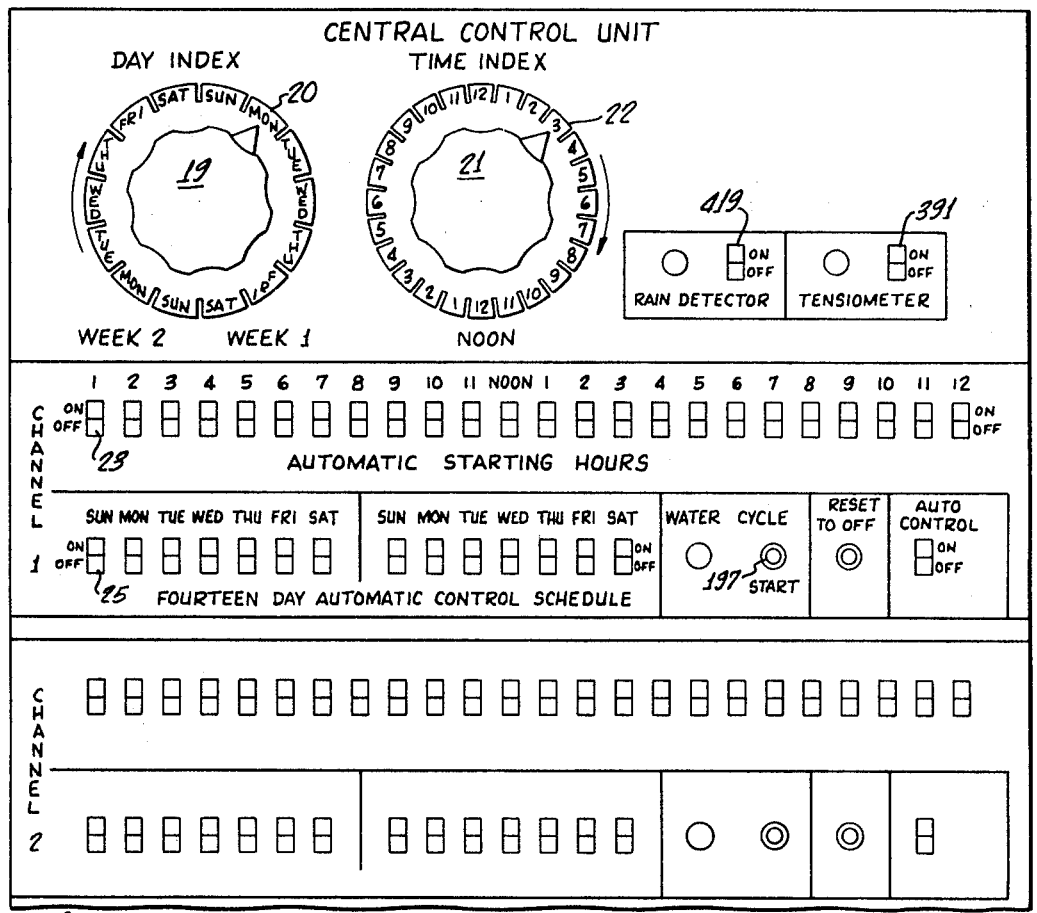
FIG. 3 is a fragmentary elevation of the face of the central control unit and illustrates primarily the various switches and indicator knobs for selecting the days of the week and the hours of the day when starting signals are to be sent to particular zone control units.

In a preferred embodiment of the invention the central control unit 11 includes six channels, each of which is operative to generate a starting signal on a different one of the six output lines 15 to initiate a schedule of valve actuations in a different one of six zone control units. A portion of the central control unit panel associated with the first two channels of the unit is shown in FIG. 3. In essence, the central control unit includes a time generator, whose status is represented by the position of a pair of indicator knobs 19 and 21, and a set of switches, one set for each channel, for selecting the time of day and the day of the week when starting signals are to be produced. The hour knob 21 rotates against a dial 22 and completes one revolution every 24 hours. The day knob 19 rotates intermittently opposite a day index dial 20 and is advanced one position every time the hour knob 21 completes one of its revolutions. The day index dial 20 has 14 positions, one position for each day of a fortnight so that a total cycle of its knob 19 takes 2 weeks to complete. In practice, the day and hour knobs 19 and 21 are adjusted for the existing time of the existing day, following which these knobs will be advanced in synchronism to indicate the correct day and the correct hour by a mechanism which will be described subsequently.

Referring only to the panel portion marked "Channel 1," since the remaining channels are identical, it includes a series of hour selector switches 23 and a series of day selector switches 25. There is one hour selector switch 23 for each of the 24 hours of the day, and a day selector switch 25 for each of the 14 days of the 2 weeks covered by the day index knob 19. The switches 23 and 25 control the days of the week and the times of the day when a starting signal is to be produced by the central control unit 11 on one of its outputs. If, for example, it is desired that such starting signals are to be produced on the output corresponding to channel 1 on Monday, Wednesday, and Friday at 6 a.m. and 6 p.m., the switches 25 for Monday, Wednesday, and Friday of both weeks and the starting hour selector switches 23 and 25 for 6 a.m. and 6 p.m. are all placed in their ON positions.

Figure 4:
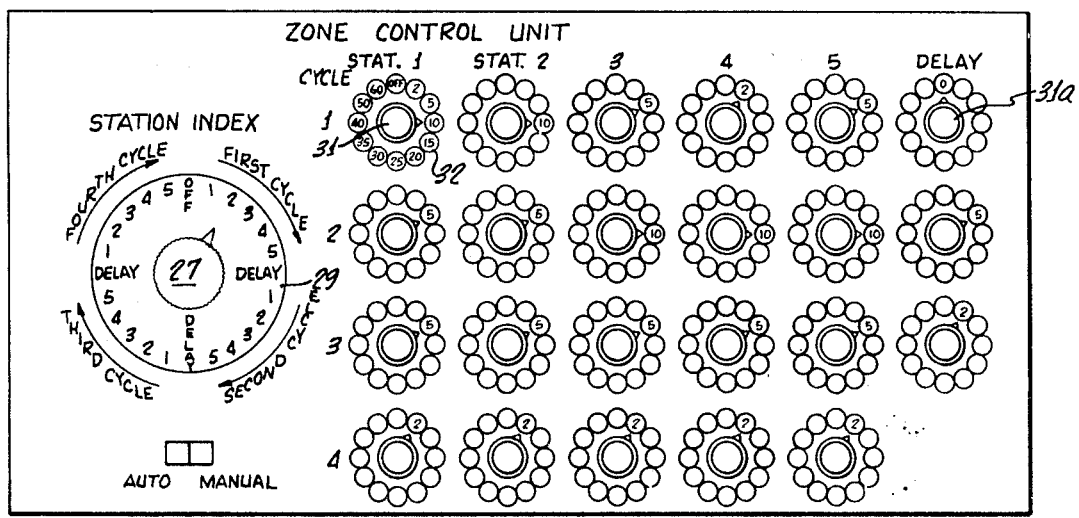
FIG. 4 is a fragmentary elevation of the face of a zone control unit, again to show by reference to its indicator and selector knobs the manner in which a multicycle valve actuating schedule may be set.

Each starting signal produced at the output of channel 1 is operative to initiate a schedule of value actuations at the particular zone control unit 13 to which the starting signal is applied. A large variety of such schedules may be selected by means of the control knobs on the face of the zone control unit 13 which is shown in FIG. 4. The zone control unit includes as its principal component a switching means which is stepped through a number of states or positions in succession in response to a starting signal from the central control unit. The particular state, or position, of the switching means is indicated on the face of the zone control unit by the station index, comprising a station index knob 27 which turns against a station index dial 29. Many arrangements are possible for the station index dial 29, depending upon the type of schedule which is to be selectable with the zone control unit. The particular arrangement shown in FIG. 4 is for four successive cycles of valve actuations during a single schedule. During each of the four cycles, the switching means and its associated knob 27 move through five positions, and in each of those positions a respective one of five valves is actuated. Moving clockwise around the station index dial 29, the knob 27 is subsequently stepped through second, third, and fourth cycles, during each of which the same five valves are again actuated. A delay position is also provided between the four cycles. When the knob 27 is in a delay position, none of the valves is actuated. The knob 27 and its associated switching means remain at each of the positions around the dial 29 for a variable period of time controlled by a set of time delay selector knobs 31 on the face of the zone control unit, there being one knob for each position on the station index dial 29. Each knob 31 is set against a dial 32 having a series of positions for time delays of 2, 5, 10, 15, 20, 25, 30, 35, 40, 50, and 60 minutes respectively.

The time delay selector knobs 31 are arranged in four rows, one row for each cycle of the station index. Each row has five knobs 31, corresponding to the five positions of the station index dial 27. Each of the first three rows of knobs also includes a knob 31a for selecting the length of time for which the station index knob 27 is to remain in a particular one of the three delay positions. The particular settings of the time delay selector knobs 31 and 31a shown in FIG. 4 illustrates one of the many schedules which may be selected for the actuation of a set of five valves. During the first cycle, the first two valves are actuated for 10 minutes each and the third, fourth, and fifth valves are actuated for 15 minutes each. A delay of zero duration is selected between the first and second cycles so that the actuation of the fifth valve is followed without delay by the second cycle, during which the first two valves are actuated for 5 minutes each and the last three valves for 10 minutes each. This is followed by a 5 minute delay to allow the irrigated area to absorb the distributed water, after which the third cycle begins, during which each of the five valves is actuated for 5 minutes. This is followed by a 2 minute delay, following which the fourth cycle is executed, during which each of the five valves is actuated for 2 minutes. After the actuation of the last valve during the fourth cycle, the knob 27 and its associated switching a schematic are returned to their OFF position, and the schedule of the zone control unit is complete.

4. Organization and Operation of the Exemplary System a. Introduction

Figure 5A:
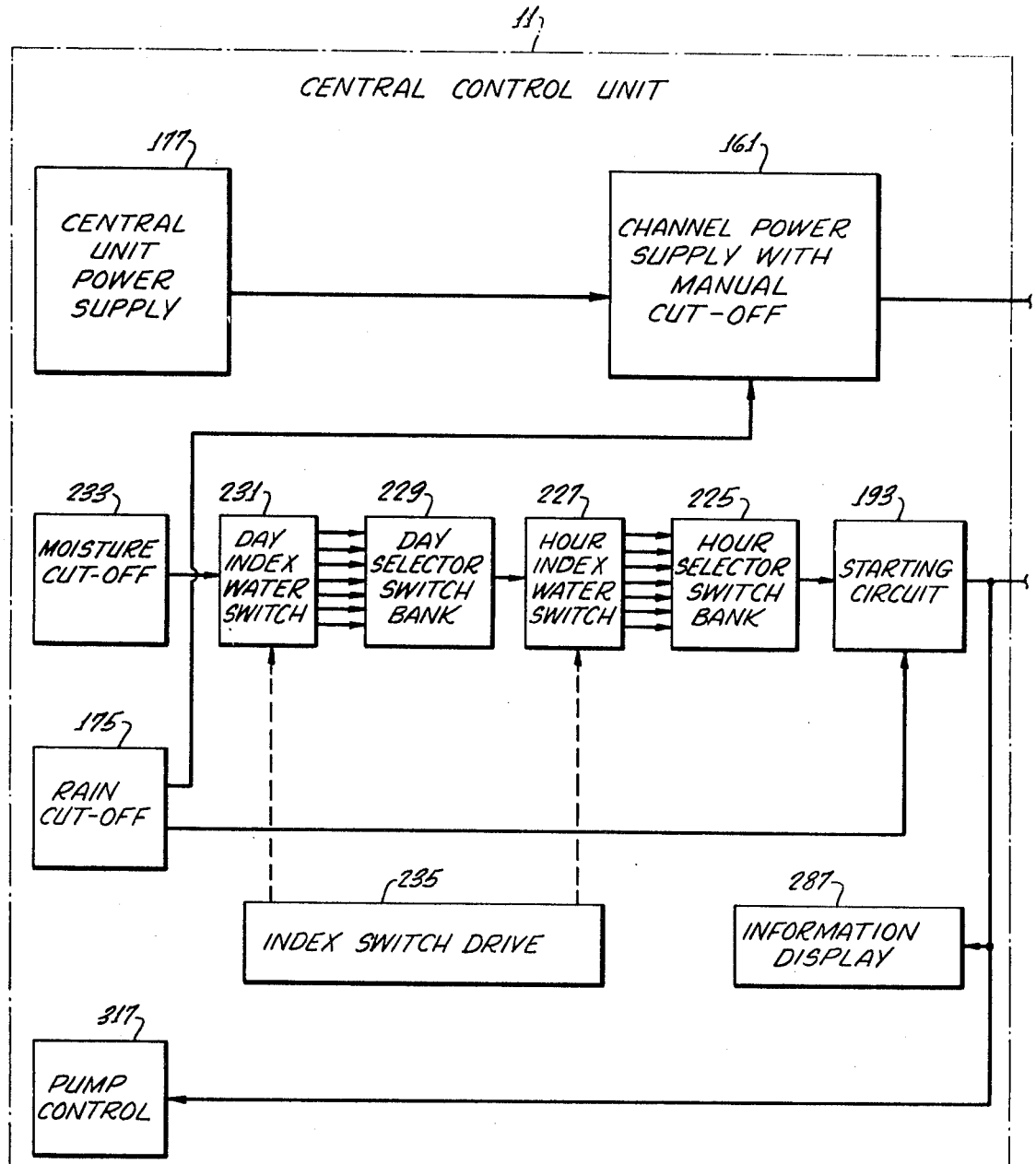
FIGS. 5a and 5b are general block diagrams of a basic system incorporating features of the present invention and including a central control unit and a single zone control unit.
Figure 5B:
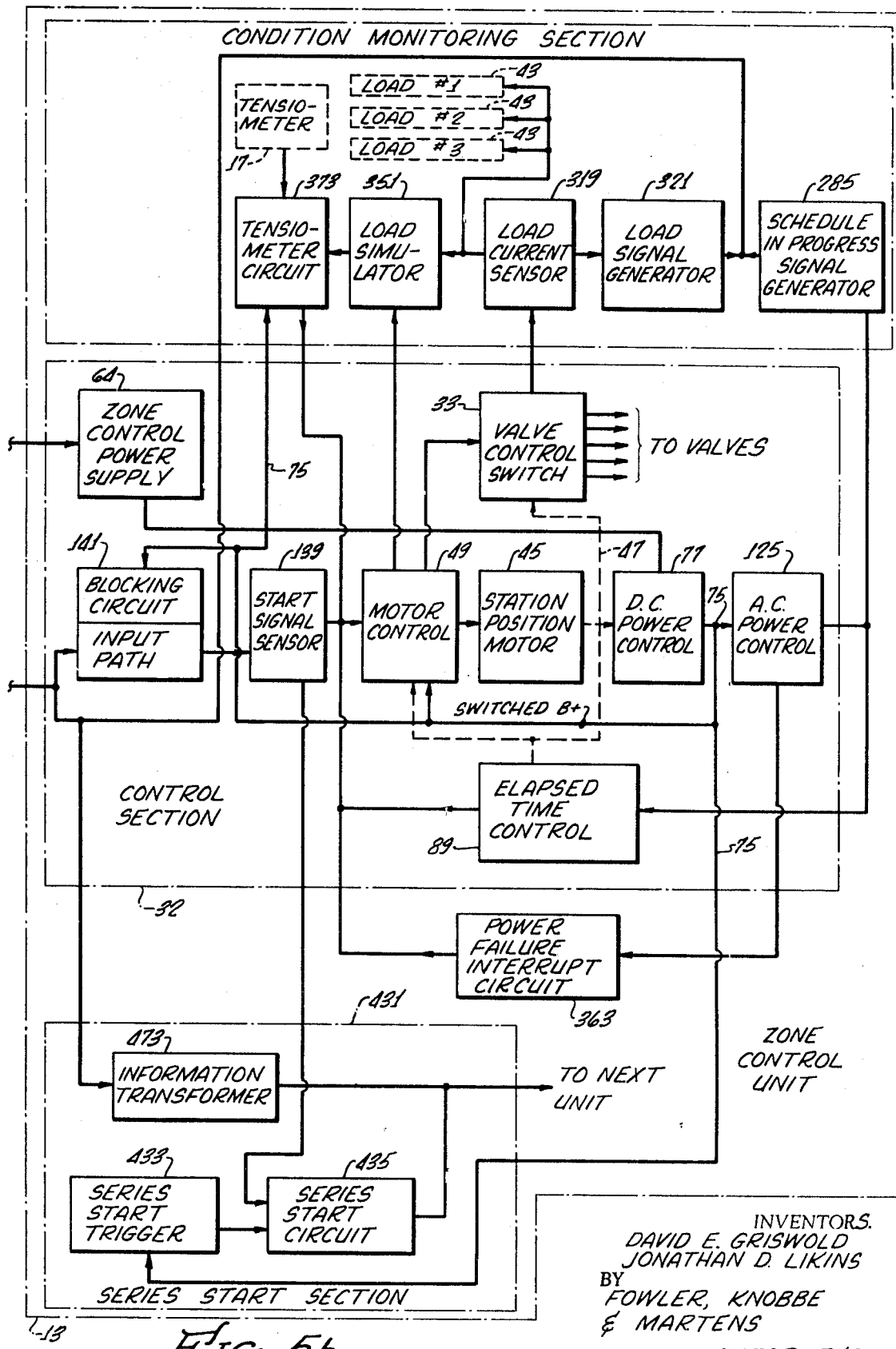

A system comprising a single zone control unit 13 and a corresponding channel of the central control unit 11 is shown in block diagram form in FIG. 5. The schematic diagram of the same system appears in FIGS. 6 and 7, which should be assembled from left to right in the order 6a, 6b, 7a, 7b. FIG. 7 is a schematic diagram of the zone control unit 13. FIG. 6 is a schematic diagram of a single channel of the central control unit 11 and additionally shows the remaining five channels of the unit in block diagram form. In describing the system shown in FIGS. 5, 6, and 7, what will be explained first are the basic components of the zone control unit 13 and the central control unit 11 which comprise the basic system for initiating and executing a schedule of valve actuations. Following this description, certain auxiliary features of the invention, carried out in some instances by components in the central control unit, in other instances by components in the zone control unit, and still in other cases by a combination of components in both of the units, will be described.

b. The Control Section of the Zone Control Unit

1. In General

Basically, it is the function of a zone control unit 13 successively to actuate selected ones of a plurality of valves for selected time intervals in response to an externally produced signal. This function is achieved by a control section 32 (FIG. 5b) which includes a switching means 33 having a rest state, a plurality of intermediate states, and a plurality of outputs connected to cause power to be applied to respective ones of the valves during successive ones of the intermediate states of the switching means. Stepping means 49 and 45 are provided to advance the switching means by one state in response to successive control signals. An initial control signal is applied to the stepping means by a start signal sensing means 139 in response to one of the externally produced starting signals so as to cause the switching means 33 to be advanced from its rest state to its first intermediate state. Following this, a delayed control signal is applied to the stepping means 49 by a timing control circuit 89 in response to each advancement of the switching means 33 to one of its intermediate states. In this way, following a starting signal, the switching means 33 is caused to spend a certain period of time in each of its intermediate states before being stepped on to its next intermediate state. During selected ones of these periods a respective one of the valves is actuated.

2. Stepping the Valve Control Wafer Switch

Figure 7A:
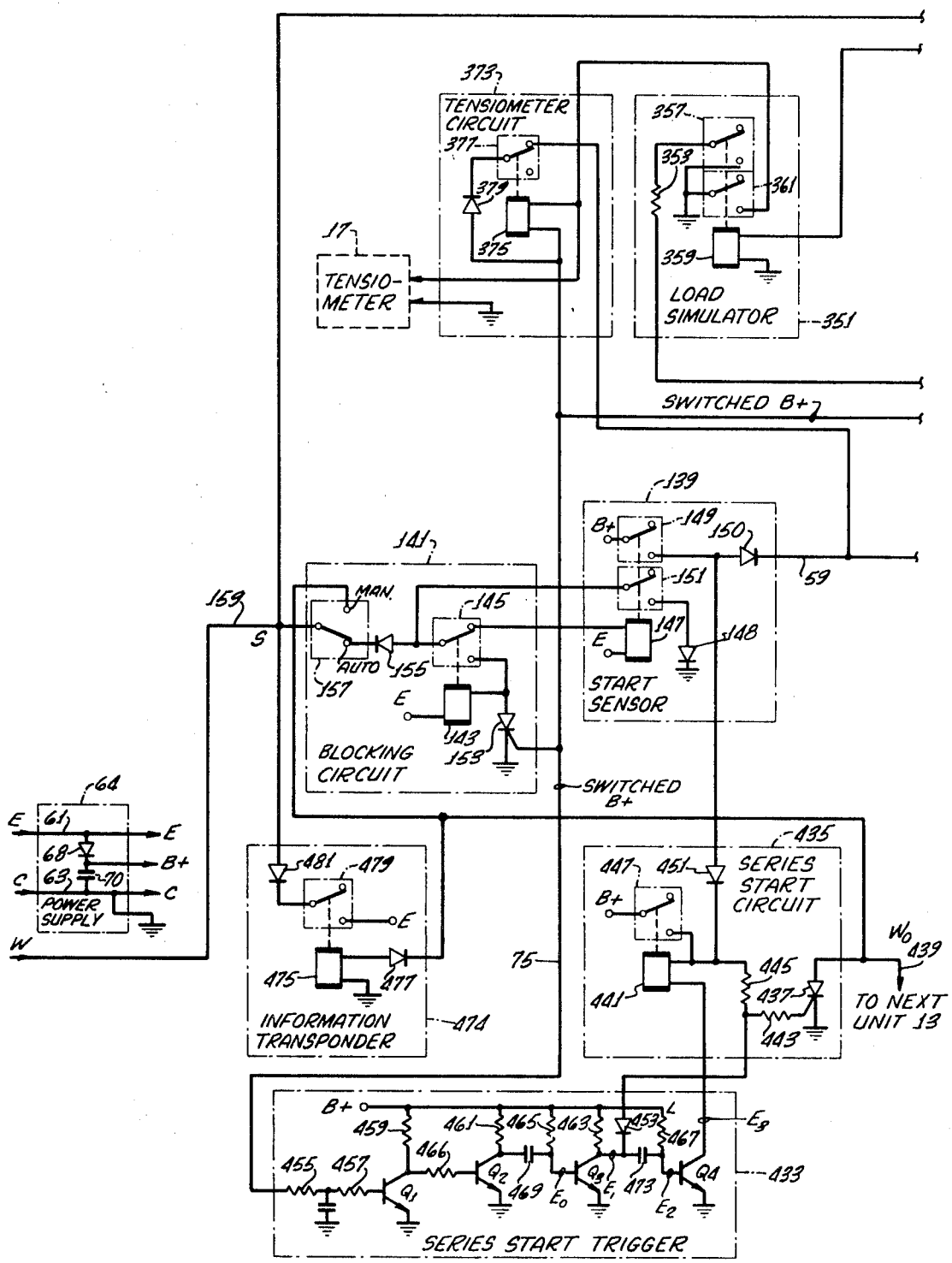
FIGS. 7a and 7b are schematic diagrams of the zone control unit shown in block form in FIGS. 5a and 5b.
Figure 7B:
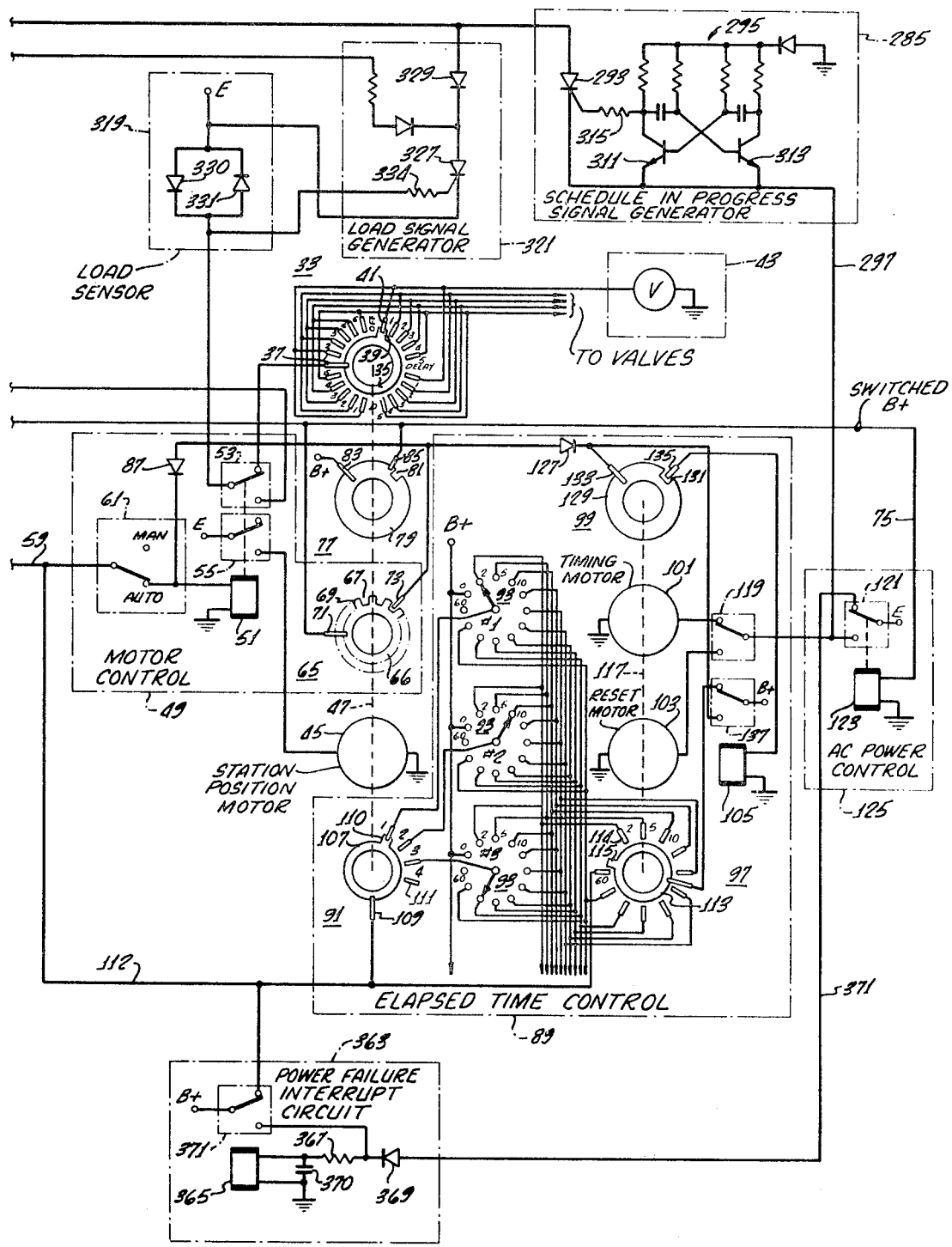

In FIG. 7b the switching means is shown as a wafer switch 33 which includes a phenolic rotor having a conductive ring 35 thereon. A stationary wiper 37 applies power to the ring 35, and a tab 39 extending from the ring 35 engages a series of 20 stationary wipers 41 around its periphery. The wipers 41 are arranged in four groups of five wipers corresponding to the four cycles of valve actuation discussed with reference to FIG. 4. Successive ones of the five wipers in each of the four groups are connected to respective ones of five valves 43. In addition to the states, or positions, of the wafer switch 33 in which its tab 39 engages one of the wipers 41, it also has a rest, or OFF, position between the set of wipers associated with the fourth and first cycles, and three delay positions, one between each of the set of wipers 41 associated with the first, second, third and fourth cycles. When the wafer switch 33 is in its rest position, or in one of the delay positions it does not engage any of the wipers 41 and no power is applied to any of the valves.

The wafer switch 33 is advanced from its rest position through its intermediate positions and back to its rest position again by means of a 1 r.p.m. station position motor 45 through an output shaft 47, under the control of a motor control 49. Together, the motor 45 and the motor control 49 comprise the means for stepping the wafer switch 33 by one position in response to a control signal applied to the motor control 49. The motor control 49 includes a relay 51 having an armature with two sets of contacts 53 and 55. The contacts 55 close when the relay 51 is energized in response to a control signal being applied to its coil over a lead 59 through a "manual-auto" switch 61, which is normally in its auto position, as shown. With the switch 61 in its "manual" position, the wafer switch 33 may be set manually by means of the knurled index knob 27 (FIG. 4) which is also keyed to the shaft 47.

The contacts 55 of the relay 51 are connected in series between the station position motor 45 and a source of AC power, labeled E. This power is received in the zone control unit over a pair of leads 61 and 63 from a power supply in the central control unit 11. The leads 61 and 63 are shown in FIG. 7a as part of a power supply 64 in the zone control unit 13. They are directly connected to several circuits in the zone control unit 13. To reduce the number of lines in the drawings, all of these connections are not shown as lines. Instead, the leads 61 and 63 are labeled E and C respectively, and a similar label is applied to any circuit point which is connected to them. Since the C line 63 serves as ground, a ground symbol is also used to indicate that a circuit point is connected thereto.

The AC voltage across the lines 61 and 63 is converted into half-wave rectified DC by means of a diode 68 and a capacitor 70 connected in series across the lines in the power supply 64. Their junction is labeled B+ and circuits through which DC is to be driven are connected across the points C and B+ of the power supply 64. When a control signal is first applied to the motor control relay 51, a circuit is completed through its contacts 55 across the power supply lines 61 and 63 through the station position motor 45, causing it to turn the rotor of the wafer switch 33 clockwise from its initial position.

The motor control 49 also includes means to keep the motor 45 energized long enough to advance the valve control wafer switch 33 by one step to its next intermediate position. For this purpose another wafer switch 65 is mounted on the shaft 47 of the station position motor 45, having a conductive ring 66 with a series of alternate notches 67 and tabs 69 thereon. The conductive ring 66 is in continuous contact with a stationary wiper 71 and in intermittent contact with another stationary wiper 73 through its tabs 69. The first stationary wiper 71 is connected to a "switched B+" line 75 to which B+ DC voltage is supplied from the zone control power supply 64 through a DC power control wafer 77. The DC power control wafer 77 is a third wafer switch mounted on the output shaft 47 of the station position motor 45 and serves to switch DC power to the line 75 as soon as the station position motor 45 has turned the valve control wafer switch 33 from its initial position. For this purpose the wafer switch 77 is provided with a conductive ring 79 having a single notch 81, a first stationary wiper 83 in continuous contact with the ring 79, and a second stationary wiper 85 which is in contact with the ring 79 at all times except when it is opposite the notch 81. This is arranged to occur when the valve control wafer switch 33 is in its rest, or OFF, position.

When the station position motor 45 has begun its advance in response to the application of a control signal to the motor control 49, a circuit is closed from the B+ output of the power supply 64 through the DC power control wafer switch 77, the switched B+ line 75, and through the motor control wafer switch 65 which is now closed, to its stationary wiper 73. This B+ voltage is applied to the motor control relay 51 through a diode 87 connected between the stationary wiper 73 and the coil of the relay, energizing the latter. Consequently, the motor 45 continues to be energized independently from the continued presence of the control signal which had initiated its movement. This movement continues until the circuit through the motor control relay 51 is broken by the motor control wafer switch 65. This occurs when the particular tab 69 of the switch 65 which had been in engagement with the output wiper 73 of the switch moves out from under the wiper and is replaced by one of the notches 67. The wafer switch 65 is so oriented on the motor shaft 47 that its notches 67 are in registry with the stationary wipers 41 of the valve control wafer switch 33, so that each time that the tab 39 of the wafer switch 33 engages one of the wipers 41 of switch, i.e. each time the switch reaches a new position, the motor control wafer switch opens and brakes the switched B+ circuit to the motor control relay 51. As a result, the motor 45 is automatically deenergized, due to the opening of the circuit to the motor control relay 51, after the motor has advanced the valve control wafer switch 33 by one position.

3. Producing a Variable Delay for Stepping the Switch

As stated at the beginning of this section, a delayed control signal is applied to the stepping means, i.e. the motor control 49 and the motor 45, in response to each advancement of the valve control switching means 33 to one of its intermediate states. This function is performed by the elapsed time control 89. Generally, the elapsed time control 89 includes a wafer switch 91, a set of time selector switches 93, timing and reset wafer switches 97 and 99, both driven by timing and reset motors 101 and 103, and a relay 105. The physical arrangement of the timing and reset wafer switches 97 and 99, and their motors 101 and 103 is shown in FIGS. 12, 13, and 14, and will be discussed later. The wafer switch 91 is mounted on the station position motor shaft 47 coaxially with the other wafer switches 33, 77, and 65 and has one position corresponding to each of the intermediate positions of the valve control wafer switch 33. It includes a conductive ring 107 having a single tab 110 which makes contact with successive ones of a series of stationary wipers 111 in successive ones of the positions of the wafer switch 91. Through a wiper 109 the conductive ring 107 is in continuous contact with the motor control relay 51 to which the wiper 109 is connected through the manual-auto switch 61 and a connecting line 112.

Each of the contacts 110 of the wafer switch 91 is connected to the wipe of a different one of the set of time selector switches 93. While only three time selector switches 93 are shown in FIG. 7, there are actually 23 of them, one for each position of the wafer switch 33. Each of the time selector switches 93 is controlled by one of the control knobs 31, 31a on the panel of the zone control unit 11 (FIG. 4), and each has a series of stationary contacts 94 with which the movable contact of the switch may be engaged. There are eleven contacts 94, labeled 0, 2, 5, 10, 15, 20, 25, 30, 35, 40 and 50 for selecting delays of from 0 to 50 minutes. The switches also have a blank position between the 50-minute and 0-minute contacts, 0 when a 60 minute delay is desired. On every one of the time selector switches 93, successive ones of the 2-minute through 50-minute stationary contacts 94 around the periphery of the switch are connected to corresponding stationary wipers 114 around the periphery of the timing wafer switch 97. The 0-minute contacts 94 of all of the selector switches 93 are connected to B+ through a common conductor 108. The 60 - minute wiper 114 of the timing wafer switch 97 is connected directly to the line 112.

In addition to its set of stationary wipers 114, the timing wafer switch 97 also includes a rotor carrying a conductive ring 113 to which B+ is normally applied by a stationary input wiper 116. The ring 113 has a tab 115 which engages successive ones of the stationary wipers 114, and applies B+ voltage to them as the rotor is turned. The rotor is mounted on a shaft 117, which is turned by both the timing motor 101 and the reset motor 103, depending upon which one of those motors is energized. The timing motor 101 is energized at the instant when the valve control wafer switch 33 has been advanced to a new position, and it turns the rotor of the timing wafer switch 97 at a rate of one revolution per hour until it is deenergized, which occurs when the switch 33 is moved from its new position. The reset motor 103 is energized at this time and returns the switch 97 to its rest position at a rate of 1 revolution per minute. When this is accomplished the reset motor 103 is also deenergized.

As seen in FIG. 12, the timing and reset wafer switches 97 and 99 are part of a single rotary phenolic switch assembly 120, having a stator member 122 bolted to a U-shaped bracket 124 and a rotor member 118 turned within the stator member by the shaft 117. The timing and reset motors 101 and 103 are mounted on opposite arms of the bracket 122. The timing switch 97 is carried on one side of the switch assembly 120 (FIG. 13) and the reset switch 99 is mounted on the other side (FIG. 14). Thus, the two switches 97 and 99 are always turned in the directions indicated in FIGS. 13 and 14 in unison through the shaft 117 by either the timer motor 101 or the reset motor 103. The motors are provided with clutches 126, 128 so that each of them may turn the shaft 117 without being hindered by the other. As best shown in FIG. 13, stationary wipers 114 of the timing switch 97 are so distributed around the periphery of its conductive ring 113 that successive ones of them are contacted by its tab 115 after 2, 5, 10, 15, 20, 25, 30, 35, 40, 50, and 60 minutes respectively.

Let it be assumed that the motor 45 has just advanced the wafer switch 33 to a new position. If it is to advance again without delay, the time selector switch 93 corresponding to that position is set to engage its 0-minute contact 94. This places B+ on the line 112 as soon as the new position is reached and the motor control relay 51 is energized, without delay. If the switch 33 is to be left in its new position for anywhere from 0 to 50 minutes, the appropriate time selector switch 93 is set to the desired delay position where its wiper engages a selected one of the contacts 94. When the requisite time has elapsed, the timing wafer switch 97 will close a path from B+ to the selected contact of the switch 93 and through it to the line 112 to energize the motor control relay 51. To select a 60 -minute delay for a given position of the switch 33, the corresponding timing switch is set on its 60-minute position so that a path is not established from B+ to the line 112 until the timing wafer switch 97 has been turned to where a circuit is made between its wipers 116 and 60-minute wiper 114, the latter of which is directly connected to the line 112.

For proper operation of the elapsed time control 89 it is necessary that the timing motor 101 be started at the instant when the valve control wafer switch 33 has been advanced to one of its intermediate positions, provided however that the timing wafer switch 97 is in its starting position. For this reason, the timing motor 101 is connected across the outputs E and C of the power supply 64 through contacts 119 of the relay 105 and through contacts 121 of a relay 123 in the AC power control 125 only when the elapsed time control relay 105 is deenergized and when the AC power control relay 123 is energized. The AC power control relay 123 is energized by the switched B+ through the DC power control wafer switch 77 during all of the time that the valve control wafer switch 33 is away from its initial position. Under these circumstances, by means to be described next, the elapsed time control relay 105 is energized with B+ voltage from the line 75 through the motor control wafer switch 65 and through the reset wafer switch 99 unless the switch 33 is in one of its intermediate positions AND the timing wafer switch 97 is in its initial position. Only if the latter two conditions exist can the relay 105 be deenergized and therefore only then will the timing motor 101 start.

The reset motor 103 is connected through the common shaft 117 to the rotors of both the timing wafer 97 and the reset wafer 99 and is energized by means of the contacts 119 when the relay 105 is energized, provided that the AC power control relay 123 is also energized at that time. This will be the case whenever the valve control switch 33 is away from its initial position. The principal function of the reset wafer switch 99 is to control the energization of the reset motor 103 through contacts 119 of the time control relay 105. Its principal part is a ring 129 carried by the rotor 118 of the switch assembly 120 (FIG. 13), and having a single notch 131. A pair of stationary wipers 133 and 135 are maintained in electrical contact with one another through the ring 123, except when the wiper 135 is in the notch 131. A diode 127 connects the output wiper 73 of the motor control wafer switch 65 to the wiper 133 of the reset wafer switch 99, closing a circuit from the switched B+ line 75 through the wafers 65 and 99 to the coil of the relay 105 whenever the wafer switch 99 is closed.

It will be helpful at this point to explain the operation of the elapsed time control 89. Let it be assumed that the valve control wafer switch 33 is in its initial OFF position and that the reset wafer switch 99 is open. Let it be assumed next that an initial control signal has been applied to the motor control relay 51 so as to energize the station position motor 45. Under these circumstances the motor shaft 47 will turn switch 33 from its OFF position toward its first intermediate position, in which it will engage the first of the stationary wiper contacts 41. The shaft 47 will also turn the DC power control wafer switch 77 and the motor control wafer switch 65.

Closure of the DC power control wafer switch 77 has the effect of energizing the AC power control relay 123 and therefore of energizing the timing motor 101 through the contacts 121 of that relay. Since the reset wafer switch 99 is open, the relay 105 is not energized and therefore its contacts 119 are in a position to complete the circuit to the timing motor 101. The timing motor 101 begins to run and, through its shaft 117, turns the rotor of its timing wafer 97 past its stationary wipers 114 until the tab 115 engages a wiper which is in contact through one of the time selector switches 93 and through the time control wafer switch 91 with the input line 59 to the motor control 49. When this happens, the motor control relay 51 is energized from the B+ voltage source 64 through contacts 137 of the relay 105 and the station position motor 45 is again energized and begins to turn its associated wafer switches to their next respective positions. This causes the motor control wafer switch 65 to close, so as to apply the switched B+ voltage through the diode 87 to the relay 51, thereby continuing to energize the station position motor 45 independently of the control signal produced by the elapsed time control.

The closing of the motor control switch 65 also has the effect of applying the switched B+ voltage through the diode 127 to the reset wafer switch 99 which, having been closed by the operation of the timing motor 101 during the timing sequence of the elapsed time control 89, completes a circuit to the coil of the time control relay 105, thereby energizing it. This reverses the state of its associated contacts 119 and 137. Reversal of the state of the contacts 137 has the effect of removing the B+ voltage from the timing wafer switch 97 and latching the relay 105 through the reset wafer switch 99. Reversal of the contacts 119, on the other hand, has the effect of transferring the E voltage from the timing motor 101 to the reset motor 103, which proceeds to drive both the reset wafer switch 99 and the timing wafer switch 97 back to their initial position, in which the reset wafer 99 opens and deenergizes the relay 105 and, through the resulting reversal of its contacts 119, also deenergizes the reset motor 103. The timing motor 101 is not reenergized at this time because, by the time the elapsed time control 89 has been reset, the station position motor 45 will have driven its associated wafer switches to their next respective positions in which the motor control wafer switch 65 is again open and, therefore, in which the switched B+ voltage is cut off from the reset wafer switch 99. At this time the valve control wafer switch 33 and the time control wafer switch 91 are both in their first intermediate positions, in which their tabs 39 and 110 are in contact with the first ones of the stationary wipers 41 and 111 respectively. With the valve control wafer switch 33 in its first intermediate position, the motor control wafer switch 65 is again open and the timing motor 101 is again energized through the contacts 119 of the time control relay 105, thereby initiating another time delay cycle in the elapsed time control unit.

The successive advancement of the valve control wafer switch 33 by control signals which are applied to the motor control 49 by the elapsed time control 89 after a predetermined delay time is repeated until the switched 33 is returned to its initial or OFF position, at which time the DC power control wafer switch 77 opens, cutting off the B+ voltage from all of the circuits which are energized by the switched B+ voltage over the line 75, including the AC power control relay 123. With its contacts 121 in the released position, the E voltage is no longer applied to either of the timing motor 101 or the reset motor 103 so that the elapsed time control unit 89 is deactivated, since no further control signals are applied over the line 112 to the motor control 49 until another schedule is initiated by a control signal over the line 59.

4. Initiating a Schedule in Response to a Starting Signal

The initial control signal, which serves to cause the station position motor 45 to move the valve control wafer switch 33 away from its OFF position, is generated by a start signal sensor 139 in response to a starting signal from the central control unit 11. Interposed between the central control unit 11 and the start signal sensor 139 is a blocking circuit 141, whose function is to disable the start signal sensor 139 when the valve control wafer switch 33 has left its rest position in response to a given starting signal and to keep the start signal sensor 139 disabled so long as that starting signal persists. In this way the blocking circuit 141 prevents the same starting signal from initiating more than one schedule in the zone control unit. Briefly, the blocking circuit includes a relay 143 having a set of contacts 145 which close a circuit for a starting signal from the central control unit 11 to the coil of a relay 147 in the start signal sensor 139. The relay 147 has two sets of contacts 149 and 151.

Once it is energized by a starting signal from the central control unit 11, the relay remains energized by means of a latching circuit from ground, through a diode 148, contacts 151 of the relay 147, contacts 145 of the blocking circuit relay 143, and through the coil of the start sensor relay 147 to the E voltage terminal. While it is energized, the relay 147 applies a B+ voltage through its contacts 149 and through a diode 150, to the motor control 49, this being the control signal which is produced by the start signal sensor 139 in response to the starting signal from the central control unit 11. As explained previously, this control signal is operative to energize the motor control relay 51 and through its contacts 55 to start the station position motor 45, which thereupon turns the valve control wafer switch 33 away from its OFF position. The control signal continues only so long as the valve control wafer switch 33 is in its OFF position. As soon as the switch 33 is moved away from its OFF position by the motor 45, the motor control wafer switch 65 and the DC power control wafer switch 77 close and complete a circuit from the B+ output of the power supply 64 to a silicon-controlled rectifier (SCR) 153 which is connected in series with the coil of the blocking circuit relay 143 between the E voltage and ground. As a result, the blocking circuit relay 143 is energized and switches its contacts 145 so as to break the circuit to the start signal sensor relay 147, thereby disabling the start signal sensor 139 and preventing it from further applying a control signal through its contacts 149 to the motor control 49.

Considering next the nature of the starting signal which is used to trigger the start signal sensor 139, one terminal of the start signal sensor relay 147 is connected to the E voltage line 61, which leads to one output of an AC power supply in the central zone control unit 11. The other terminal of the relay is connected through the contacts 145 of the blocking circuit 143, when that relay is deenergized, through a diode 155 and through contacts 157 of the auto-manual switch, to a signal line 159 labeled W which is connected to one of the outputs of the central control unit 11. In particular, the central control includes means for completing a circuit through the line 159 to the other output of its AC power supply, which is at ground potential. Closure of this circuit in the central control unit 11 is what is referred to herein as a starting signal and it has the effect of energizing the start signal sensor relay 147, which thus registers the signal.

When the blocking circuit relay 143 is energized through the SCR 153 as a result of the action of the station position motor 45, a circuit is closed from the coil of the relay 143 to ground in parallel with the SCR 153 through the contacts 145 of the relay, the signal line 159 and through the starting signal generating means in the central control unit 11 which, it will be recalled, generates a starting signal by completing a circuit from the line 159 to ground. Consequently, even after the blocking circuit relay 143 ceases to be deenergized by the action of the SCR 153, it will continue to be deenergized nevertheless by the action of the starting signal generating means in the central control unit 11 so long as the starting signal persists, i.e. so long as the signal line 159 is connected to ground in the central control unit 11.

c. The Starting Signal Generator of the Central Control Unit.

1. In General

Figure 6A:
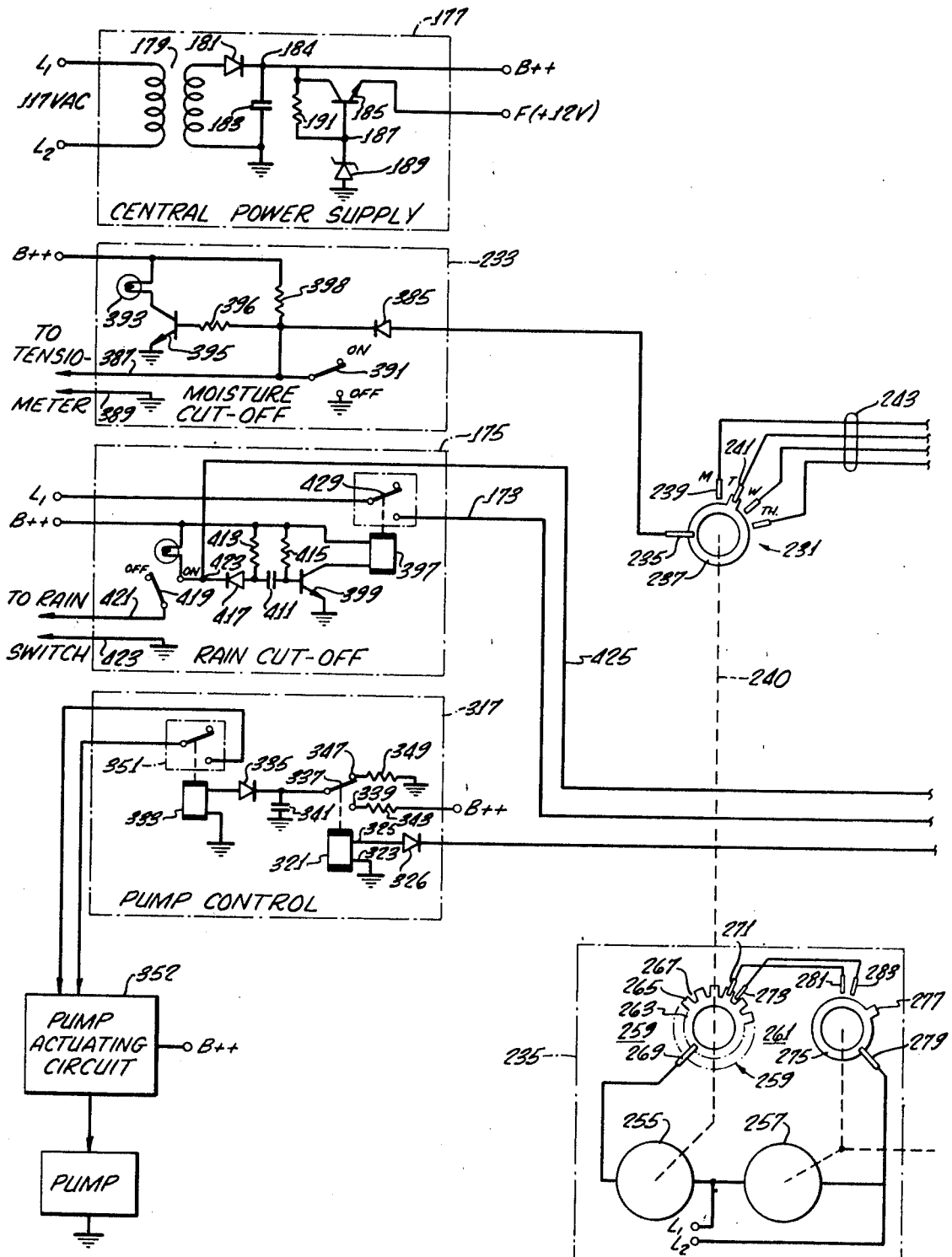
FIGS. 6a and 6b are schematic diagrams of the central control unit illustrated in block form in FIGS. 5a and 5b.
Figure 6B:
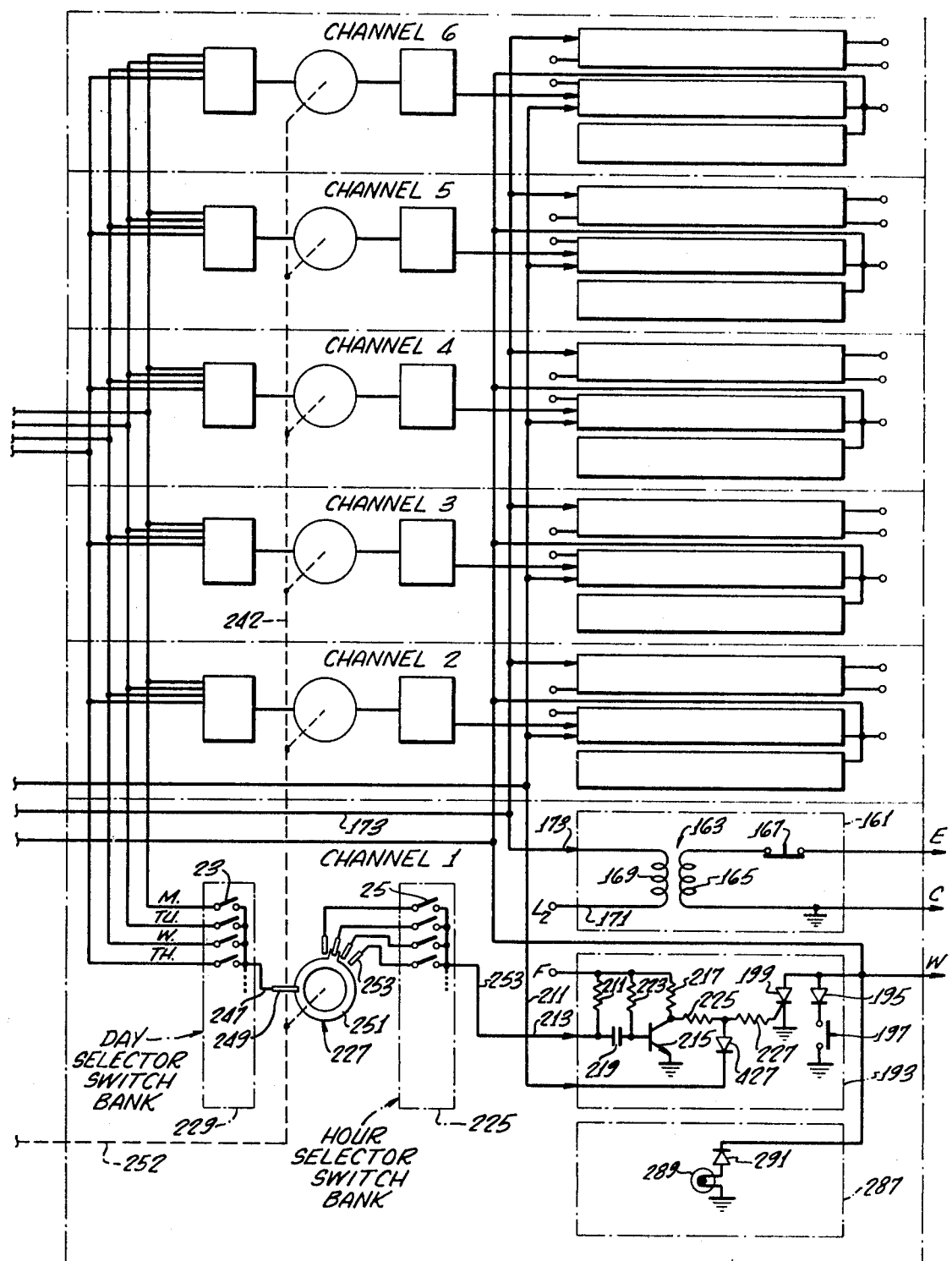

Referring now to FIGS. 6a and 6b, those components of the central control unit which serve to generate a starting signal at selected hours of selected days will be described next.

As described in the preceding section, the starting signal is in the form of a connection between the W signal line 159 and ground, which results in the energizing of the start signal sensor relay 147.

The power supply 64 in the zone control unit receives 60-cycle AC power from the central control unit 11 over the E and C lines 61 and 63 from a "channel" power supply 161 in the central control unit 11. There is a separate channel in the central control unit 11 for each zone control unit 13 controlled by it. Each channel has its own channel power supply 161 for powering its associated zone control unit 13. Several other components are duplicated in the several channels of the central control unit 11 as can be seen in FIG. 6b. Only those components which are associated with channel 1 will be discussed in detail.

The channel power supply 161 comprises a transformer 163 whose secondary 165 is connected through an interrupt switch 167 across the E and C leads 61 and 63. The primary winding 169 of the transformer 163 is connected over leads 171 and 173 through a "rain cutoff" circuit 175 across a source of 117-volt AC power, labeled L-1 and L-2. The function of the rain cutoff circuit 175 will be described subsequently. Suffice it to say that, when it is not raining the transformer 163 is energized and feeds power to the zone control unit power supply 64 over the E and C power lines 61 and 63.

The 117-volt AC power is also applied to a central power supply 177 in the central control unit 11. The power supply 177 serves to provide 42-volt DC at its output labeled B++ and also serves to provide a regulated voltage at a level of approximately 12 volts at its output labeled F. The B++ and F voltages are used exclusively for the operation of the various circuits in the central control 11. It is of conventional construction and includes a transformer 179 having a primary connected across the L-1, L-2 terminals of the AC power supply, which may be simply an electrical outlet. A diode 181 and a capacitor 183 are connected in series across the secondary of the transformer 179, causing a DC voltage of about 42 volts to appear across the capacitor 183. One plate of the capacitor 183 is connected to ground and the other plate is connected to the B++ output of the power supply 177.

To produce the +12-volt DC between the terminal F and ground, a transistor 185 is connected with its collector-emitter circuit in series between the terminal B++, which is at 42 volts, and the terminal F. The base of the transistor 185 is connected to the junction 187 of a Zener diode 189 and a resistor 191 which are connected in series between ground and the B++ terminal. The transistor 185 connects the F output of the power supply 177 to its B++ output only when the Zener diode 189 is nonconductive. When the Zener diode 189 conducts, it clamps the base of the transistor 185 to ground, thereby rendering the transistor nonconductive. A voltage level of 12 volts is maintained at the output terminal F by so selecting the breakdown characteristic of the Zener diode 189 that it will break down whenever the voltage at the base of the transistor 187 rises above 12 volts.

2. Shaping the Starting Signal

Returning to the consideration of channel 1, the connection of the W signal line 159 to ground is made in a starting circuit 193. It may be made either manually through a diode 195 by a pushbutton switch 197 or automatically at selected hours of selected days through a silicon-controlled rectifier (SCR) 199. The pushbutton switch 197 may be actuated at any time to initiate a schedule in the zone control unit controlled by channel 1 and is also shown in FIG. 3 as the "Cycle Start" button. The start circuit 193 includes means for closing the SCR 199 for a short period of time in response to a signal applied to the inputs of the circuit. These inputs include a terminal 211, which is connected to the 12-volt F output of the central power supply 177 and a terminal 213, which is connected through a number of day and hour selector switches, to be described later, to ground. The hour and time selector switches are so arranged that a circuit is established through them at the particular time of the particular day when a starting signal is to be produced by the starting circuit 193, at which time the input terminal 213 of the starting circuit becomes grounded.

In order to limit the length of time for which the SCR 199 is closed in response to the grounding of the input terminal 213, the starting circuit 193 includes a timing circuit, comprising a grounded emitter transistor 215 whose collector is connected the 12-volt terminal 211 through a resistor 217. A capacitor 219 connects the base of the transistor 215 to the input terminal 213 of the circuit. The opposite plates of the capacitor 219 are connected to the 12-volt terminal 211 through a pair of resistors 221 and 223 respectively.

Normally, prior to the grounding of the input terminal 213, both plates of the capacitor 219 are held at approximately +12 volts through the resistors 211 and 223, and the transistor 215 is fully conductive. Under these conditions the collector of the transistor 215 is at ground and, through a pair of resistors 225 and 227 which are connected in series between the collector of the transistor 215 and the gate electrode of the SCR 199, the gate electrode of the SCR is clamped, maintaining the SCR in a nonconductive condition.

When the input terminal 213 is connected to ground, the left plate of the capacitor 219, which had been held at +12 volts through the resistor 211, drops by 12 volts and this drop is transmitted through the capacitor 219 to the base of the transistor 215 which had been held at the +12 volt level through the resistor 223. As a result, the transistor 215 is cut off and its collector rises from approximately ground level to nearly +12 volts. This voltage rise is applied through the resistors 225 and 227 to the gate electrode of the SCR 199, turning it on and thus intitiating the starting signal from the starting circuit 193.

Beginning with the instant when the input 213 becomes grounded, the input capacitor 219 is charged through the resistor 223 from the 12-volt terminal 211 so that the base of the transistor 215 immediately begins to rise from ground level toward +12 volts. As a result, a short time after the transistor 215 has been cut off and the SCR 199 has been turned on, the voltage at the base of the transistor 215 rises sufficiently to turn it on again and turn the SCR off again. Thus, regardless of the period of time over which the input 213 is grounded, the starting circuit 193 produces a starting signal whose duration is brief. The shortness of the starting signal produced by the starting circuit 193 serves the same purpose as that which is served by the blocking circuit 141. Indeed, the blocking circuit 141, which cuts off the start signal sensor 139 so long as the starting signal persists, is designed for starting circuits other than that shown in FIG. 6b which produce much longer starting signals, thus raising the risk of the same starting signal causing two schedules to be initiated at the zone control unit. Similarly, the starting circuit 193 is designed to be operable not only with the zone control unit 13 shown in FIG. 7 but also with zone control units of the type which do not block an overlong starting signal.

3. Timing The Starting Signal

Having described the manner in which a starting signal of short duration is produced in response to the grounding of the input terminal 213 of the starting circuit 193, the manner in which this grounding may be made to occur at selected hours of selected days during a two week period will be described next.

Basically, the grounding of the starting circuit input 213 is through a number of circuits which are connected in series between that terminal and ground and which are arranged to complete that circuit on the days and at the hours when it is desired that the starting circuit 193 produce a starting signal. These circuits include an hour selector switch bank 225, an hour wafer switch 227, a day selector switch bank 229, a day wafer switch 231 and a moisture cutoff circuit 233. The day wafer switch 231 is of the same type as the valve control wafer switch 33 discussed with reference to FIG. 7b. It has a single stationary wiper 235 which makes continuous contact with a conductive ring 237 carried by a phenolic rotor mounted on a shaft 240. A series of 14 stationary wipers 239 are distributed around the periphery of the ring 237 and successive ones of these wipers are engaged in successive positions of the switch 231 by a tab 241 carried by the ring 237. In all, the switch has 14 positions corresponding to the 14 positions of the day index dial 19 (FIG. 3) so that, during each day of a 2-week period, a different one of the 14 wipers 239 is connected to ground through the switch 231 and through the moisture cutoff circuit 233.

Each of the 14 contacts 239 of the day selector switch 231 is connected over a set of 14 lines 143 (only four of which are shown) to a different one of a set of 14 day selector switches 23 (also shown in FIG. 3), which together comprise the day selector switch bank 229. While the input contact of each switch 23 is connected to a different wiper 239 of the day selector wafer switch 231, the output contacts of all of the switches 23 are connected to a common output 247. This output is connected to the stationary wiper 249 of the hour selector wafer switch 227, which is similar in construction to the day selector wafer switch 231. It includes a conductive ring 251 carried by a rotor mounted on a shaft 252 which also carries the hour index knob 21 (FIG. 3). A series of 24 equally spaced stationary wipers 253 surround the ring 251.

The switch 227 has 24 positions, corresponding to the 24 positions of the time index knob 21. As the time index knob 21 is turned through its 24 positions by the shaft 252, the rotor of the index wafer switch 227 also turns and the ring 227 carried by the rotor closes a circuit between the stationary wiper 249 and successive ones of the 24 stationary wipers 253. Each of the wipers 253 is connected to a different one of 24 hour selector switches 25 (also shown in FIG. 3) which together make up the hour selector switch bank 225. The output contacts of the hour selector switches 25 are connected to a common output point 253 which is connected to the ground input 213 of the starting circuit 193.

The day index wafer switch 231 is advanced one position at the end of every day and the hour index wafer switch 227 is continuously advanced throughout each day so as to make a circuit to ground through a different one of its 24 wipers 253.

A connection from ground through the moisture cutoff circuit 233, the day index wafer switch 231, and the day selector switch bank 229 to the output 247 of that switch bank may be established for any of all days of the 2-week period covered by the day index switch 231 by closing that one or those ones of the switches 23 which are associated with the day or days on which such a connection is to be made. For any of these selected days the connection from ground may be completed further, from the output 247 of the day selector switch bank 229 to the input 213 of the starting circuit 193 at any hour of the day by closing the switches associated with the hours of the day when such a connection is to be completed. Thus, at each selected hour of a selected day a connection will be established from ground to the starting circuit 193, causing it to produce a brief starting signal.

The foregoing description of how a starting signal may be derived was with reference to the day index wafer switch 231 and the various components of channel 1 of the central control unit 11. The same explanation applies also to the remaining five channels of that unit. In particular, each of the channels 2 through 6 includes a starting circuit 193, an hour selector switch bank 225, an hour index wafer switch 227, and a day selector switch bank 229 which are connected to one another and to the day index wafer switch 231 in the same manner as are the corresponding components n channel 1. Agreeably with this arrangement, the rotors of all of the wafer switches 227 in channels 2 through 6 are mounted on the same shaft 252 which carries the wafer switch 227 of channel 1. All of the wafer switches 227 in channels 1 through 6 are identically oriented on their common shaft 252 so that they all engage corresponding ones of their stationary wipers 253 at the same time. Thus, a connection may be established through the day selector switch bank 23 of any of the channels 2 through 6 from the day index wafer switch 231 to the hour index wafer switch 227 of that channel and the connection may be completed to the starting circuit 193 of that channel through its hour selector switch bank 225 exactly as described for channel 1.

4. Driving The Day And Hour Index Wafer Switches

Turning now to the manner in which the index wafer switches 231 and 227 are driven, the shafts 240 and 252 of the wafer switches are respectively turned by means of a day change motor 255 and an hour motor 257, both of which form part of an index switch drive 235.

The day change motor 107 is caused to turn the day index wafer switch 231 from a given position to the next by an advance wafer switch 259 driven by the day change motor 255 and by an advance wafer switch 261 driven by the hour motor 257. The advance wafer switch 259 is similar in construction to the motor control wafer switch 65 shown in FIG. 7b. It has a rotor mounted on the shaft 240 and mounted on the rotor is a conductive ring 263 having a plurality of alternating tongues 265 and notches 267, one for each of the 14 positions of the index wafer switch 231. A first stationary wiper 269 makes continuous contact with the conductive ring 263. A second stationary wiper 271 and a third stationary wiper 273 are so positioned that alternate ones of them are engaged by one of the tabs 265. In particular, the switch 259 makes contact between its wipers 269 and 271 when the index wafer switch 231 is in one of its day selecting positions. A similar contact is made by the switch 259 between its wipers 269 and 273 when the wafer switch 231 is between its day selecting positions.

The advance wafer switch 261 includes a rotor carrying a conductive ring 275 with a single tab 277. A stationary wiper 279 is provided to engage the ring 275 continuously, and a pair of stationary wipers 281 and 283 are positioned so that the first of them is engaged by the tab 277 at 12 midnight and the second of them is similarly engaged by the tab at 12:30 a.m. A direct connection is made between the respective wiper pairs 271, 281 and 273, 283 of the advance wafer switches 259 and 261.

The hour motor 257 is continuously energized from the L-1, L-2 outputs of the 117-volt AC source. The day change motor 255, on the other hand, is connected to that voltage source through the advance wafer switches 259 and 261. Normally, this circuit is open because neither of the wafers 281 and 283 is engaged by the tab 277 of the advance wafer switch 261. This condition is illustrated in FIG. 8a, which shows the positions of the wafer switches 231, 227, 259, and 261 at 11:00 p.m. of the first Tuesday in the 2-week period covered by the day index.

The index switch drive 235 first becomes operative at 12:01 a.m. of the following day, as illustrated in FIG. 8b. At this time the tab 277 of the advance wafer 261 has engaged the stationary wiper 281, thus closing a circuit to the particular tab 265a of the advance wafer switch 259 which up to that time had been in contact with its associated stationary wiper 271 as shown in FIG. 8a. This completes a circuit through the stationary wiper 269 of the advance wafer switch 259 to the day change motor 255 advancing it until the tab 265 breaks contact with the wiper 271 and makes contact with the wiper 273 instead. As seen in FIG. 8b, the day index wafer switch 231 is between its Tuesday and Wednesday positions at this time. This condition continues until a half hour later, at which time the advance wafer switch 261 makes contact between its stationary wipers 279 and 283. This completes a circuit through the day change motor 255 through the advance wafer switch 259 which up to this time has maintained contact between its wipers 269 and 273 through its tab 265a. As a result, the day change motor 255 is again energized, and turns the shaft 240 and the wafer switch 231 another half position until it reaches its Wednesday position as shown in FIG. 8c. When this occurs the advance wafer switch 259 breaks the contact between its wipers 273 and 269, thus deenergizing the motor. The switch 259 also reestablishes the contact between its wipers 260 and 271, but this does not result in the continuing energization of the motor 255 because, by this time, the wafer switch 261 has broken the contact between its wipers 281 and 279. Therefore, the switch 261 will not close and the motor 255 will not become energized again until 11:30 p.m. of the following day.

d. Information Feedback

The system of FIGS. 5, 6, and 7 includes a signal generating, transmitting and receiving network, whereby an indication is produced at the central control unit whenever a schedule is in progress at the zone control unit, i.e. whenever the valve control wafer switch 33 is away from its OFF position. Included in this network, a simplified schematic diagram of which is presented in FIG. 10, is a "Schedule in Progress" signal generator 285 in the zone control unit 13, an information display 287 in the central control unit 11, and the E and W leads 61 and 159 extending between the units 11 and 13. The information display 287 in the central control unit 11 includes a lamp 289 and a diode 291 connected in series between the grounded output terminal of the channel power supply 161 and the W lead 159. Through the W lead 159 of the cathode of the diode 291 is connected to the anode of a silicon-controlled rectifier (SCR) 293 in the "Schedule in Progress" signal generator 285 in the zone control unit 13. The cathode of the SCR 293 is connected to the contacts 121 of the AC power control 125 and becomes connected to the E output of the zone control unit power supply 64 through those contacts whenever the AC power control relay 123 is energized. This, it will be recalled, happens whenever a schedule is in progress in the zone control unit 13. Therefore, whenever such a schedule is in progress, a circuit is closed from secondary winding 165 of the channel power supply 161 in the central control unit 11 through the diode 291 and through the SCR 293 to the indicator lamp 289, provided that the SCR 293 is in a conductive state. For reasons which will become apparent later, the SCR 293 is made conductive only intermittently so that, when a schedule is in progress in the zone control unit 13, this is indicated in the central control unit 11 by the flashing of the lamp 289. Also, for reasons which will become apparent later, the burst of current which are thus applied to the indicator lamp 289 are allowed to flow only in one direction, namely that in which the diode 291 and the SCR 293 are poled. Nevertheless, these bursts of unidirectional pulsating current are sufficient to give the desired indication of a schedule in progress.

The "Schedule in Progress" signal generator 285 includes an intermittent trigger circuit 295 which is energized through a line 297 through the contacts 121 of the AC power control 123 whenever that relay is energized, i.e. whenever a schedule is in progress. The trigger circuit 295 is shown in FIG. 7b as a conventional free-running multivibrator having a pair of cross-coupled transistors 311 and 313. The duty cycle of the multivibrator 295 is not critical but it has been selected in a particular embodiment to be about 20 percent on and 80 percent off. The pulsating output of the multivibrator 295 is taken from the collector if its transistor 311 and is applied through a coupling resistor 315 to the gate electrode of the SCR 293.

In addition to the means for transmitting a signal from the zone control unit 13 to the central control unit 11 indicative of a schedule being in progress, the system also includes a control network whereby a central pump is automatically actuated by a sensing means in the central control unit 11 in response to a signal which is transmitted thereto from the zone control unit 13 whenever any of its set of valves 43 is being actuated. In the central control unit 11 this network includes a pump control unit 317 and, in the zone control unit 11 its components include a load sensor 319 and a load signal generator 321.

As best seen in FIG. 9, the pump control 317 includes a sensing relay 321 whose coil is connected at one of its ends 323 to the grounded end of the output winding 165 of the channel power supply transformer 163. The other end 325 of the relay coil is connected through a diode 326 to the W lead 159, and through that lead to the anode of an SCR 327 which is in the load signal generator 321 of the zone control unit 13. As seen in FIG. 7b, this connection is made through an additional diode 329 which is between the anode of the SCR 327 and the line 159 and which serves to isolate the load signal generator 321 from undesired signals.

The cathode of the SCR 327 is connected to the E terminal of the zone control power supply 64 which is returned over the E line 61 to the ungrounded terminal of the channel power supply secondary winding 165 through the interrupt switch 167 in that supply. Through the circuit which is thus established between the channel power supply 161, the pump control 317, and the SCR 327 of the load signal generator 321, power is applied to the coil of the pump control relay 321 whenever the load signal generator SCR 327 is turned on. This occurs whenever the load sensor 319 detects the flow of current into one of the valves 43 through the valve control wafer switch 33. The load sensor 319 includes a pair of diodes 329 and 331 connected back to back in series between the E terminal of the zone control unit power supply 64 and the set of relay contacts 53 in the motor control 49. When the valve control wafer switch 33 is in one of its intermediate position, in which it makes contact with one of its stationary wipers 41, a circuit is closed from ground through one of the valves 43, the wafer switch 33, the motor control relay contacts 53, and the load sensor 319 to the E terminal of the power supply 64. The resultant current flow through the diodes 329 and 331 of the load sensor 319 produces a voltage drop across them, whose magnitude is approximately 0.65 volts regardless of the amount of current drawn by the particular valve or valves which may be drawing current through them. This voltage is the output of the load sensor 319 and is applied across the gate electrode and cathode of the load signal generator SCR 327 through a coupling resistor 333, turning on the SCR whenever load current is drawn by a valve.

It will be noted that, as was the case with the Schedule in Progress signaling network, the current which is driven through the pump control relay 321 when the load signal generator SCR 327 is turned on is kept unidirectional by the diode 326 and the SCR 327 and that the direction of current is the same as it is when the indicator lamp 289 is being flashed. To permit the pump control 317 to distinguish between the intermittent signals which are being sent by the signal generator 285 to actuate the lamp 289 and the continuous signal which is sent by the load signal generator 321 to actuate the pump control 317, the pump control is made to respond only to a continuous signal. Generally it may be said that the load signal generator 321 and the Schedule in Progress signal generator 285 operate at different duty cycles, one being continuous and the other being intermittent, and that the pump control 317 and the indicator lamp 289 are designed to respond to those duty cycles respectively. Actually, while the pump control 317 responds only to a continuous signal, the indicator lamp 289 responds both the continuous signal and to an intermittent one, so that it responds to signals at both of the above duty cycles.

To prevent the pump control 317 from responding to the intermittent signals being sent from the zone control unit 13, it is provided with a second relay 333 having a coil connected between ground and the B++ terminal of the power supply 177 through a Zener diode 335 and through a pair of normally open contacts 337 and 339 on the relay 321. The Zener diode 335, whose anode is connected to the coil of the relay 333, is connected to ground through a storage capacitor 341. When the sensing relay 321 is energized, its contacts 337 and 339 close. Current, however, is not driven through the coil of the relay 333 until the capacitor 341 becomes sufficiently charged to break down the Zener diode 335. The time required for this to occur depends on the time constant of the capacitor 341 and a resistor 343 which is connected between the contact 339 and the B++ output of the power supply 177 and through which the capacitor is charged.

By proper selection of the components 341 and 343 the time constant is made such that the capacitor 341 does not become charged sufficiently to break down the Zener diode 335 during the time period covered by a single burst of current from the Schedule in Progress signal generator 285. Consequently, the relay 321 is released and its contacts 337 and 339 break the circuit to the coil of the relay 333 before the latter has become energized. When this occurs, a discharge path is established from the capacitor 341 to ground through a normally open relay contact 347 and a resistor 349.

If a signal which is being sent from the zone control unit 13 to the pump control sensing relay 321 is continuous, indicating that it is a pump control signal, the contacts 337 and 339 are held closed for a sufficiently long time to charge the capacitor 341 to the level where it breaks down the Zener diode 335 and energizes the relay 333. Through its normally open contacts 351 the relay 333 closes a current path in a pump actuating circuit 352 which actuates the pump, in response. When the pump-actuating signal ceases, the relay 321 is deenergized and a very short time period later the charge across the capacitor 341 drops sufficiently to cause the relay 333 to become deenergized also, at which time the pump is deactuated.

Summarizing, each time the valve control wafer switch 33 closes a circuit through one of its wipers 41 to a valve 43, the valve load current produces a voltage drop across the load sensor 319 which turns on the load signal generator SCR 327. This completes a circuit for continuous unidirectional current through the pump control sensing relay 321 which energizes its associated relay 333, closing a circuit to apply power to the central pump of the system.

When the wafer switch 33 is being advanced from one of its valve-actuating positions to the next, it does not make contact with any of its wipers 31, and there is no load current drawn by any of the valves through the load sensor 319. Consequently, during these periods, if no other provision were made, the pump control 317 would tend to deenergize its relays 321 and 333. While it is desirable that the pump not be energized while the switch 33 is in one of its delay positions, since this may last up to an hour, it would result in an unnecessarily large number of actuations and deactuations of the relays as well as of the pump which is controlled by them if this were to occur each time the switch 33 is advanced between its valve-actuating positions. To eliminate this problem, load simulator means 351 are provided in the zone control unit 13, for connecting a dummy load to receive current through the load sensor 319 from the terminal E in place of the valve 43 between the times when the valve selector wafer switch 33 is in successive ones of its valve actuating positions. The load simulator 351 includes a dummy load resistor 353 which is connected in series between the load sensor 319 and ground only when two conditions exist. First, the wafer selector switch 33 must not be in one of its valve-actuating or delay positions. Second, in its last intermediate position the wafer switch 33 must have supplied current to a valve 43. If such current had not been supplied current by the switch 33 in its last position, there would be no need to maintain such current by applying the dummy load 353.

To achieve the connection of the dummy load 353 under only the above conjunctive conditions, one of its ends is connected to ground only when one of the conditions exists and its opposite end is connected to the load sensor circuit 319 only when the other condition exists, so that both conditions must occur simultaneously for the dummy load 353 to be substituted for one of the valves 43. In particular, one end of the dummy load 353 is connected to load sensor 319 through the normally open ones of the motor control relay contacts 53 which are closed only when the valve control wafer switch 33 is being turned. The opposite end of the resistor 353 is connected to ground through a pair of normally open contacts 357 carried by a relay 359 in the load simulator 351. The coil of the relay 359 is connected between ground and the E terminal of the zone control power supply 64 through the load signal generator SCR 327. As a result, the load simulator relay 359 closes its contacts 357 so as to connect the dummy load 353 to ground only when the SCR 327 has been turned on as a result of the load sensor 319 having detected a valve drawing current through the valve control wafer switch 33.

Summarizing the operation of the load simulator 351, if one of the valves 43 is drawing load current, the load simulator relay 359 is energized and closes its contacts 351 to connect one end of the dummy load resistor 353 to ground. Subsequently, when the motor control relay 51 is energized to advance the valve control wafer switch 33 to its next position, the contacts 53 of that relay connect the other end of the dummy load resistor 353 to the load sensor 319. With a load current now being drawn through the load sensor 319 by the dummy load resistor 353, the SCR 327 remains in its conductive condition and effectively latches the load simulator relay 359 so as to maintain the dummy load resistor 353 in the circuit until it is broken by the contacts 53 of the motor control relay 51 when the wafer switch 33 has reached its next position.

It is worth noting that both of the feedback signals which are being sent from the zone control unit 13 to the central control unit 11 are transmitted over the same pair of wires 61 and 159 over which the starting signal is sent from the central control unit 11 back to the zone control unit. Thus, in effect, three different kinds of signals are transmitted over a single pair of wires, two of them in a given direction and a third in the opposite direction. This is being achieved by connecting an alternating current source, the channel power supply secondary winding 165 in series with one of the wires, the lead 61. Additionally, first and second sensing means are provided in the central control unit in the form of the information display 287 and the pump control 317 for sensing current flow through the wires in a given direction, with the first and second sensing means being responsive to current flow at first and second (intermittent and continuous) duty cycles respectively. A third sensing means is being provided in the zone control unit 13 in the form of the start sensor 139 to detect current flow through the wires in the opposite direction.

To generate the current flow which would be operative to activate the third sensing means of the system, a first switching means, shown as the SCR 199, is being provided in the central control unit 11 for completing a circuit through the wires and through the sensing means in the zone control unit 13 to carry current only in the direction sensed by that sensing means. Similarly, second and third switching means, shown as the SCR's 327 and 293 are being provided in the zone control unit 13, each switching means serving to complete a circuit independently of the other through the wires and through the first and second sensing means in the central control unit 11 so as to carry current in the direction sensed by them.

To initiate the transmission of signals from the zone control unit 13 to the central control unit 11, means are being provided in the zone control unit 13 for closing its switching means 327 at the continuous duty cycle while any of the set of valves 43 are being actuated. Means are also being provided in the zone control unit 13 for closing its switching means 293 at the intermittent duty cycle while a schedule is in progress. Finally, means are being provided at the central control unit 11 for actuating the central pump in response to the detection of current by its sensing means 317 and means are also provided to produce an indication in response to the detection of current by its second sensing means 287, that a schedule is in progress.

e. Schedule Abort

The zone control unit 13 includes a circuit which serves to return its valve control switch 33 to its rest state, i.e., its OFF position, in response to the interruption and subsequent return of electric power which is normally being supplied to it from the central control unit 11. This provision insures that, if power has been cut off for an indeterminate period and is then returned to the zone control unit 13 at a later time, it does not resume its schedule at that time, since it may be quite inopportune. Secondly, this feature also permits a schedule which is in progress to be terminated by interrupting the supply of power from the central control unit.

The termination of a schedule in response to the interruption of power to the zone control unit 13 is achieved by the AC power control 125 in combination with a power failure interrupt circuit 363. The power failure interrupt circuit 363 includes a relay 365 whose coil is connected between ground and the E output of the power supply 64 through a resistor 367, a diode 369, a lead 371, and the contacts 121 of the AC power control relay 123 when the latter is not energized. The relay 365 is made slow acting by connecting a capacitor 370 across its coil. When the power failure interrupt relay 365 is deenergized, a connection is made through its contacts 371 from the B+ terminal, to the input lead 59 of the motor control 49 so as to apply a control signal thereto.

Under normal conditions, when a schedule is not in progress but when the zone control unit 13 is energized through the E and C leads 61 and 63, the AC power control relay 123 is deenergized because the DC power control wafer switch 77 is open. Consequently, a circuit is closed across ground and the E output of the power supply 64 through the AC power control relay contacts 121 and through the coil of the power failure interrupt relay 365, causing the latter to actuate its contact 371 so as to break the circuit between the B+ terminal of the power supply 64 and the input to the motor control 49.

The relay 365 remains energized by the B+ voltage which is applied to its coil through its contacts 371 in response to the initial energization of that relay by the signal from the AC power control relay 125.

When a schedule is inititated in response to a starting signal from the start sensor 139, B+ voltage is applied to the AC power control relay 123 through the DC power control wafer switch 77. As a result, the AC power control relay 123 transfers its contacts 121, breaking the circuit from the E terminal of the power supply 64 to the coil of the power failure interrupt circuit relay 365. That relay, however, remains energized through the latching circuit established by its contacts 371 as previously described. The relays 123 and 365 remain in their energized states until the schedule is completed, at which time the circuit to the coil of the AC power control relay 123 is broken. The relay 365, however, still remains energized due to its latching circuit and will continue in that state until power to the zone control unit 13 is cut off, at which time both of the relays 123 and 365 are, of course, deenergized. If such a power cutoff should occur while a schedule is being performed, the result will be that when power is returned, the AC power control relay 123 is energized and immediately interrupts the circuit from the E voltage terminal to the relay 365 before the latter has a chance to transfer its contacts 371. B+ voltage is therefore applied to the motor control relay 51 until the station position motor 45 returns the wafer switch 33 to its OFF position. At this point the switched B+ is cut off by the DC wafer switch 77 from the AC power control relay 123, its contacts 121 close a circuit between the AC power terminal E and the power failure relay 365, whereupon its contacts 371 cut off the B+ voltage from the motor control relay 51 and the motor 45 stops.

A schedule which is in progress may be arbitrarily terminated with the power failure interrupt circuit 363 by depressing the interrupt switch 167 in the channel power supply 161 of the central control unit 11.

f. The Tensiometer Circuit

Referring to FIG. 1 as well as to FIG. 7, it will be recalled that each zone control unit 13 controls a series of valves 43 which are distributed over a zone of the area to be irrigated. Successive ones of these valves are serially turned on for predetermined periods of time in response to a starting signal from the central control unit 11 in accordance with a preselected schedule. Typically, such a schedule includes several cycles during which the sequential actuation of the valves is repeated. A delay period may be selected between successive cycles.

Associated with each zone control unit 13, and in particular with each set of valves, is a single tensiometer 17 whose function is to signal a moist condition of the particular zone being irrigated under the control of the zone control unit. Only one tensiometer is usually provided because of its cost. Therefore a logical way should be provided to terminate a schedule in response to an overmoist condition.

In designing a system for terminating a schedule, two choices are possible in deciding how the system should respond to a moisture indication by the tensiometer 17. One choice is to abort the schedule as soon as a moisture condition is indicated so that if, for example, such a condition is indicated after the second of the five valves 43 has completed its operation, the third, fourth, and fifth valves are not permitted to complete their scheduled operations. Instead, the system is returned to its original position. The other possible choice is to hold in abeyance any response to a moisture indication until the end of the cycle when all of the valves in the set have been actuated, and to abort the remaining cycles that may have been programmed. In this way all of the zone may be uniformly irrigated. The latter choice is desirable and is exercised in the design of the disclosed system.

In carrying out this feature of the invention, a tensiometer circuit 373 is provided, which registers a moist condition signaled by its associated tensiometer 17 but does not allow that condition to manifest itself upon the control 59 of the motor control circuit 49 until the following delay period, when the current cycle of the particular schedule under progress has been completed. More particularly, the tensiometer circuit 373 includes a relay 375 whose winding is connected at one end to the switched B+ voltage on the line 75 from the DC power control wafer switch 77 and whose other end is connected to ground through two parallel paths. One of these paths is through the tensiometer and is completed so long as the ground is dry. The tensiometer is not a part of the invention nor of the zone control unit and is shown only in block form in FIG. 7a. It is sufficient to know that it is characterized by providing a short circuit between its terminals only so long as the ground in which it is inserted is dry. Under an excessively moist ground condition the tensiometer opens and interrupts the circuit between its terminals.

The other parallel path to ground from the coil of the tensiometer relay 375 is through a pair of normally open contacts 361 carried by the load simulator relay 359 which are closed when that relay is energized. This occurs as long as there is either a real or a simulated load receiving current through the load sensor 319.

Under normal operation, so long as the ground is dry, the tensiometer relay 375 will be energized due to the complete circuit through the tensiometer to ground. If the ground becomes sufficiently moist and the tensiometer opens, this opens one of the two alternate paths from ground to the coil of the tensiometer relay 375. That relay remains energized, however, because of the alternate circuit from ground through the load simulator relay contacts 361. This alternate path continues until the cycle which is then being performed in completed, at which time the valve control wafer switch 33 is advanced into its delay position, where no load current is drawn through the load sensor 319. As a result of the lack of current through the load sensor 319, the simulator relay 359 and its contacts 361 interrupt the remaining path to ground from the tensiometer relay 375, which therefore also becomes deenergized. This completes a circuit through a pair of normally open contacts 377 of the relay to the motor control 49 from the switched B+ line 75, causing the station position motor 45 to be driven until the switch 33 is returned to its OFF position, at which time the switched B+ is cut off from the line 75 by the DC power control wafer switch 77.

g. Moisture Cut Off

During the description of the central control unit 11 and of the manner in which it produces a starting signal, reference was made to the moisture cutoff circuit 233. Its purpose is to prevent a starting signal from being sent by the central control unit 11 if a centrally located tensiometer, which is connected to the moisture cutoff 233, indicates that the ground near the central control 11 unit is too moist. It will also be recalled that the starting signal is produced in the central control unit 11 by making a connection from ground through a series of switches, the first of which is the day index wafer switch 231. This series of switches is prevented from completing the circuit from ground by connecting the wiper 235 of the day index wafer switch 231 through a diode 385 and through the centrally located tensiometer (not shown, but connected to a pair of terminals 387 and 389 of the moisture cutoff circuit 233) to ground. As a result, if the ground is too moist in the vicinity of the central control unit 11, the tensiometer breaks the circuit from ground to the wafer switch 213.

A switch 391 in the moisture cutoff circuit 233 is connected across the terminals 387 and 389 so as to disable it if one is used, or alternately, to allow the central control unit 11 to operate if a tensiometer is not connected to the terminals 387 and 389. The bypass switch 391 is also shown on the face of the central control unit in FIG. 3. The presence of moisture sensed by the tensiometer across the terminals 387 and 389 is indicated by a lamp 393 connected in series between the B++ line and ground through the collector-emitter circuit of a transistor 395 whose base is connected through a pair of resistors 396 and 398 to the B++ line. The transistor 395 conducts and turns on the lamp 393 only when excessive ground moisture causes the tensiometer to open its circuit between the terminal 387 and 389. At all other times the base of the transistor is maintained at near ground level and does not conduct.

h. The Rain Cut Off Circuit

In the preceding section means have been described whereby the central control unit 11 is prevented from sending out starting signals which might initiate valve actuating schedules. In the present section, means will be described which are also located in the central control unit 11 and which are associated with an external rain sensor. These means also serve to prevent the central control unit from generating starting signals but do so in response to rain rather than ground moisture. Moreover, these means also serve to interrupt momentarily the supply of electric power to all of the zone control units 13 automatically when the rain sensor detects rain so that their schedules will be terminated at that time.

The foregoing functions are carried out by the rain cutoff circuit 175 in the central control unit 11. It is comprised of a rain cutoff relay 397 whose coil is connected between the B++ terminal of the central power supply 177 and ground through the collector-emitter circuit of a grounded emitter transistor 399. A delay circuit is connected to the base of the transistor 399 and includes a capacitor 411 connected at its opposite plates to the B++ terminal through a pair of resistors 413 and 415. The junction of the capacitor 411 and the resistor 415 is the output of the delay circuit and is connected to the base of the transistor 399. The input to the delay circuit is at the junction of the resistor 413 and the capacitor 411 and is connected through a diode 417, and an ON-OFF switch 419 to the first of two input terminals 421 and 423. The other input terminal, 423, is connected to ground. A rain switch (not shown) is connected between the terminals 421 and 423 and is operative to connect them directly when it rains.

The rain cutoff circuit 175 has two outputs. The first output is taken from the junction 423 of the diode 417 and the ON-OFF switch 419 and serves to disable the starting circuit 193. In particular, the junction 423 is connected over a line 425 to the cathode of a diode 427 which is located in the starting circuit 193 and whose anode is connected to the junction of its resistors 225 and 227. When it rains, a short circuit is established by the rain switch between the input terminals 421 and 423 of the rain cutoff circuit 175, clamping the cathode of the diode 427 to ground, and effectively disabling the starting circuit 193 from applying a positive signal to the gate electrode of its SCR 199.

A second output of the rain cutoff circuit 175 is taken from its normally open contacts 429 which are in a series circuit with the primary winding 169 of the channel power supply transformer 163 between the AC terminals L-1 and L-2. Thus, the channel power supply 163 receives power only when the rain cutoff relay 397 is energized. This is normally the case. However, when it rains, the cathode of the diode 417 in the rain cutoff circuit is clamped to ground through the rain switch and shifts the potential on both plates of the capacitor 411 from their normally positive level to approximately ground level. This voltage level shift is applied to the base of the transistor 399, cutting it off and causing it to interrupt the current to the rain cutoff relay 397. At the same time, however, the capacitor 411 begins to be charged through the resistor 415 so that the voltage at the base of the transistor 399 begins to rise. A very short time after the transistor was initially cutoff, it is turned on again and the relay 397 is again energized. Thus, the contacts 429 of the rain cutoff relay 397 are opened momentarily in response to rain and cutoff power from the channel power supply 161 in all of the channels 1 through 6. This, in turn, has the effect of terminating the schedules which are in progress at that time in all zone control units 13 that are associated with those channels.

i. The Series Start Circuit

In accordance with a feature of the present invention discussed briefly with reference to FIGS. 1 and 2, some of the zone control units 13, or all if desired, are arranged in chains and each zone control unit in such a chain includes means to generate a starting signal for the next zone control unit in that chain. It is desirable that such a starting signal be of short duration, like that which is produced by the central control unit and that it be generated only if two conditions exist. The first condition is that a zone control unit 13 shall have been started by means of an external starting signal. The second condition is that the zone control unit shall have completed its scheduled series of operations. A short starting signal is to be produced when these two conditions have been met.

The reason why a starting signal is not to be produced by a zone control unit unless it was started in response to an external starting signal is that, where this otherwise, a manual starting of a given zone control unit, for which provision is made, to apply localized sprinkling would have the effect of setting into motion the operation of a whole series of subsequent zone control units in the chain. To produce a starting signal only under the above conditions, the zone control unit 13 includes a series start section 431. The series start section 431 includes a series start trigger 433 and a series start circuit 435. The starting signal is produced in the series start circuit 435 by turning on an SCR 437 therein. The cathode and anode of the SCR 437 are respectively connected to ground and to an output terminal labeled WO. The manner in which this serves as a start signal for the following zone control unit is illustrated in FIG. 11. Thus, the output terminal WO of each series start circuit 435 in a chain is connected to the S input of the blocking circuit 141 of the next zone control unit 13 in the chain. All of the zone control units 13 are connected to a common ground through the C conductor 63, and in each zone control unit a circuit is closed to that common ground through the SCR of the preceding zone control unit or, in the case of the first zone control unit 13, through the SCR 199 of the central control unit 11.

The switching of the SCR 437 is controlled by a series start circuit relay 441. In particular, the gate electrode of the SCR 437 is connected to the power supply B+ terminal through a pair of coupling resistors 443 and 445 and through a set of normally open contacts 447 of the relay 441. It will be recalled that the SCR 437 is to be turned on for a short period of time, (1) only if the zone control unit 13 of which it is a part was started by a starting signal and (2) only when the schedule in progress at that zone control unit has been completed.

To satisfy the first of the above two requirements, the series start relay 441 is energized by the control signal, which is produced by the start sensor 139 in response to an external starting signal. Thus, the coil of the relay 441 receives B+ voltage through contacts 149 of the start sensor relay 147, when that relay is energized, through a diode 451 which is connected between one of the contacts 149 and one terminal of the coil of the relay 441. The other terminal of the relay coil is connected to ground through a transistor $Q_4$ in the series start trigger 433. The series start trigger 433 includes a cascaded series of four grounded emitter transistors $Q_1$, $Q_2$, $Q_3$ and $Q_4$. In a manner which will be explained shortly, the output transistor $Q_4$ is held on while a schedule is being performed in the zone control unit 13. Thus, provided that the schedule was initiated in response to a starting signal, a circuit will be closed during that schedule from B+ to ground through the coil of the series start relay 441.

In order to satisfy the second of the above two requirements for energizing the SCR 437, the junction of the resistors 443 and 445, which are connected between the gate electrode of the SCR and the relay contacts 447, is connected through a clamping diode 453 to the collector of transistor $Q_3$ in the series start trigger 433. The diode 453 is poled for conduction through the transistor $Q_3$ to ground, and that transistor is held on from the start of a schedule until its end, at which time it is turned off briefly. So long as the transistor $Q_3$ is on, it clamps the junction of the series start circuit resistors 437 and 445 to ground and prevents the SCR 437 from being turned on.

When a schedule has been initiated in response to an external starting signal, the start sensor relay contacts 149 close, and the series start trigger transistor $Q_4$ is turned on, causing the series start relay 441 to be energized and to close its contacts 447. The relay 441 latches through its contacts 447, but the B+ voltage is prevented from passing through the coupling resistors 445 and 443 to the gate electrode of the SCR 437 by the clamping diode 453 whose cathode is held at ground by the transistor $Q_3$ which is also on. This continues until the schedule has been completed, at which time the transistor $Q_3$ is turned off briefly, thus allowing the B+ voltage to be applied briefly to the SCR 437, thereby turning it on for a short period of time. Shortly thereafter, the transistor $Q_4$ is turned off for a brief period of time to interrupt the circuit through the coil of the relay 441 so as to deenergize it. This resetting of the relay 441 places the series start section 431 in readiness for generating another starting signal at the end of the next schedule which is initiated in response to an external starting signal.

Turning now to the manner in which the series start trigger 433 causes the transistors $Q_3$ and $Q_4$ to be briefly switched off in succession at the end of a schedule, the series start trigger 433 is controlled by the switched B+ voltage on the line 75 which is connected to the base of the first transistor $Q_1$ through a pair of input resistors 455 and 457. All of the transistors $Q_1$, $Q_2$, $Q_3$ and $Q_4$ have their emitters connected to ground. The collectors of transistors $Q_1$, $Q_2$ and $Q_3$ are connected to the B+ output terminal of the zone control power supply 64 through respective ones of load resistors 459, 461 and 463. The bases of the transistors $Q_3$ and $Q_4$ receive a positive bias from the B+ terminal through their respective base biasing resistors 465 and 467. A coupling capacitor 469 is connected between the collector of transistor $Q_2$ and the base of transistor $Q_3$ so as to clamp the latter to ground temporarily when the transistor $Q_2$ is turned on. Similarly, to temporarily clamp the base of transistor $Q_4$ to ground when the transistor $Q_3$ is turned on, a coupling capacitor 473 is connected between them.

When a schedule begins, B+ voltage is switched onto the line 75 through the DC power control wafer switch 77 and as a result, the transistor $Q_1$ turns on, clamping the base of transistor $Q_2$ to ground, whereupon that transistor is turned off. The transistors $Q_3$ and $Q_4$ remain on by virtue of the bias voltages applied to their bases through their respective base biasing resistors 465 and 467. The voltage levels which exist at this time at the base and collector of transistor $Q_3$ are shown in FIG. 10 as the waveforms $E_0$ and $E_1$. Similarly, the voltages at the base and collector of the transistor $Q_4$ appear in FIG. 10 as the waveforms $E_2$ and $E_3$. The waveforms $E_0$, $E_1$, $E_2$ and $E_3$ are shown to go through three successive states, state I, state II, and state III. The first state during which the bases of the transistors $Q_3$ and $Q_4$ are at B+ and their collectors are at ground, continues until the end of the schedule which is in progress. When the schedule in progress has been completed, or is terminated, the switched B+ voltage is cut off from the line 75. As a result, the transistor $Q_1$ is turned off and the transistor $Q_2$ is turned on. When the transistor $Q_2$ turns on, its collector, and one plate of the coupling capacitor 469 connected thereto, are pulled from B+ to ground and this voltage shift is transmitted through the coupling capacitor 469 to the base of the transistor $Q_3$, turning that transistor off. As a result, the voltage $E_1$ at the collector of the transistor $Q_3$ rises to the B+ level. This also raises the cathode of the clamping diode 453, permitting the series start SCR 437 to be turned on. The voltage level $E_2$ at the base of the transistor $Q_4$ also rises by an amount equal approximately to the B+ voltage. However, since the transistor $Q_4$ is already conducting, this increase in its base voltage has no immediate effect.

The voltage level $E_0$ at the base of transistor $Q_3$ remains at ground for only a short period of time, because the coupling capacitor 469 begins to be charged through the base bias resistor 465 and through the transistor $Q_2$ immediately after the latter has been turned on at the beginning of state II. After a short time the capacitor 469 becomes charged sufficiently to raise the voltage $E_0$ at the base of transistor $Q_3$ high enough to turn that transistor on again. As a result, the voltage level $E_1$ at the collector of the transistor $Q_3$ drops back to ground so as to reestablish the clamp upon the series start circuit 435 through the clamping diode 453. This marks the end of state II of the series start trigger 433.

During state II of the series start trigger 433, the voltage $E_2$ at the base of transistor $Q_4$ has dropped back to B+ due to the partial discharging of the capacitor 473 during that state. The voltage level $E_2$ drops suddenly from B+ to ground level at the end of state II as a result of the conduction by the transistor $Q_3$ at that time, which drops the level at the collector of the transistor $Q_3$ from B+ to ground. As a result, the transistor $Q_4$ is cut off and interrupts the circuit through the coil of the series start relay 441. This is indicated by the rise of the voltage level $E_3$ at the collector of the transistor $Q_4$. Shortly thereafter, the capacitor 473 is charged through the transistor $Q_3$ and through the base resistor 467 sufficiently to raise the voltage $E_2$ at the base of the transistor $Q_4$ to a point where that transistor turns on again. This marks the end of state III and the beginning of state I of the series start trigger 433.

What has been described thus far in connection with the series start section 431 is the manner in which a starting signal applied to the S input of a zone control unit 13 has the delayed effect of producing at the end of the sequence which it has initiated another starting signal at the WO output terminal of that unit. It is axiomatic that, if a starting signal at the S terminal is to have only a delayed effect at the WO output terminal, the two terminals must not be connected directly. Consequently, a path must be provided between the two for the feedback signals which are sent from the remaining zone control units 13 in the chain and which are intended for the various sensing devices in the central control unit 11. Such an indirect path is provided by an information transponder 474 which forms the third of the three blocks in the series start section 431. It is comprised of a relay 475 whose coil is connected between ground and the WO terminal through a diode 477 which is poled so as to allow the transponder relay 475 to respond to the unidirectional signal currents fed back from the zone control unit 13 whose S terminal is connected thereto. Whenever such a feedback signal is received, the transponder relay 475 closes its normally open contacts 479 which are connected in series with a diode 481 between the S input terminal of the zone control unit and the E terminal of the power supply 64. Consequently, every time a feedback signal is received a the WO terminal, current is drawn through the line 159 and through the sensing means in the central control unit 11. Even where a chain includes several zone control units 13, as shown in FIG. 11, the feedback signals sent from any of them are relayed in this manner through their respective transponders 474 back to the central control unit 11.

What we claim is:

1. Apparatus for programming the cyclic actuation of a plurality of valves for selected time intervals on selected days of the week at selected hours of the day, comprising in combination:
   a. a central control unit for generating starting signals at selected hours of selected days;
   b. a chain of at least two individual zone control units, each responsive to a starting signal successively to actuate selected ones of a respective set of valves for selected periods of time in accordance with a preselected schedule, and each generating a starting signal when the selected actuation of the last of its associated set of valves has been completed;
   c. means for applying the starting signal from said central control unit to the first zone control unit in said chain; and
   d. means for applying the output signal from said first zone control unit to the next zone control unit in said chain, so that successive zone control unit sand their associated valves are actuated in response to the completion of a schedule by the preceding zone control unit in said chain.

2. Apparatus in accordance with claim 1 and characterized further by
   a. means in each zone control unit in said chain for producing a monitor signal while that zone control unit is in operation;
   b. display means in said central control unit for producing an indication in response to said monitor signal; and
   c. means at each said zone control unit for relaying said monitor signal from the next succeeding zone control unit to the preceding zone control unit in the chain so that said display means is made to respond to the operation of each of said zone control units.

3. In an irrigation system wherein water is supplied under pressure by means of a central pump to a plurality of remotely located valves, a pump and valve control system comprising in combination:
   a. a central control unit for generating starting signals at selected hours of selected days and having a pump control unit for controlling power to said central pump;
   b. at least one remotely located zone control unit responsive to a starting signal successively to actuate selected ones of a set of valves for selected periods of time, said zone control unit having means for generating a pump-actuating signal while any of said set of valves is being actuated;
   c. means for transmitting said starting signals to said zone control unit; and
   d. means for transmitting said pump-actuating signal to said pump control unit so that said pump shall become actuated when any of said valves is actuated.

4. Apparatus for programming the cyclic actuation of a set of valves for selected time intervals on selected days of the week at selected hours of the day comprising in combination:
   a. a central control unit for generating starting signals at selected hours of selected days;
   b. a remotely located electrically powered zone control unit responsive to a starting signal from said central control unit to actuate said set of valves in accordance with a preselected program;
   c. power supply means in said central control unit;
   d. means for transmitting the output of said power supply means to said zone control unit;
   e. means in said zone control unit for terminating a partially executed program in response to the interruption and subsequent resumption of electric power; and
   f. means in said central control unit for manually interrupting the supply of electric power to said zone control unit, thereby to permit manual termination of a partially executed program.

5. The apparatus of claim 4 characterized further by rain switch means in said control unit associated with an external rain sensor for preventing said central control unit from generating starting signals and for momentarily interrupting the supply of electric power to said control unit automatically when said rain sensor detects rain.

6. In an irrigation system wherein water is supplied under pressure by means of a central pump to a plurality of remotely located valves, a pump and valve control system comprising in combination:
   a. a central control unit;
   b. a remotely located zone control unit;
   c. a pair of wires connecting said units;
   d. an alternating current source in said central control unit connected in series with one of said wires;
   e. means in each unit for sensing current flow through said wires in a respective one of mutually opposite directions;
   f. switching means in each unit for completing a respective circuit through said wires and through the sensing means in the other unit, the circuit completed by the switching means in a given unit being capable of carrying current only in the direction sensed by the sensing means in the other unit;
   g. means in said central control unit for closing its switching means at selected hours of selected days;
   h. means in said zone control unit for successively actuating selected ones of a set of valves for selected periods of time in accordance with a preset schedule in response to the detection of current by its sensing means;
i. means in said zone control unit for closing its switching means while any of said set of valves is being actuated; and
j. means in said central control unit for actuating said central pump in response to the detection of current by its sensing means.

7. The apparatus of claim 6 characterized further by
a. a third wire connecting said alternating current source to said zone control unit;
b. control means in said zone control unit powered by current from said alternating current source through said third wire and through the wire which is in series with said alternating current source and responsive to the interruption of said current to abort a schedule in progress when said current is reapplied; and
c. means in said central control unit for interrupting the supply of said current to said control means.

8. In apparatus for programming the cyclic actuation of a plurality of valves for selected time intervals on selected days of the week at selected hours of the day, the combination comprising:
a. a central control unit;
b. a remotely located zone control unit;
c. a pair of wires connecting said units;
d. an alternating current source in said central control unit connected in series with one of said wires;
e. means in each unit for sensing current flow through said wires in a respective one of mutually opposite directions;
f. switching means in each unit for completing a respective circuit through said wires and through the sensing means in the other unit, the circuit completed by the switching means in a given unit being capable of carrying current only in the direction sensed by the sensing means in the other unit;
g. means in said central control unit for closing its switching means at selected hours of selected days;
h. means in said zone control unit for successively actuating selected one of a set of valves for selected periods of time in accordance with a preset schedule in response to the detection of current by its sensing means;
i. means in said zone control unit for closing its switching means while said schedule is in progress; and
j. means in said central control unit for indicating that said schedule is in progress in response to the detection of current by its sensing means.

9. In an irrigation system wherein water is supplied under pressure by means of a central pump to a plurality of remotely located valves, a pump and valve control system comprising in combination:
a. a central control unit;
b. a remotely located zone control unit;
c. a pair of wires connecting said units;
d. an alternating current source in said central control unit connected in series with one of said wires;
e. means in each unit for sensing current flow through said wires in a respective one of mutually opposite directions;
f. switching means in each unit for completing a respective circuit through said wires and through the sensing means in the other unit, the circuit completed by the switching means in a given unit being capable of carrying current only in the direction sensed by the sensing means in the other unit;
g. means in said central control unit for closing its switching means at selected hours of selected days;
h. switching means in said zone control unit for successively connecting selected ones of said valves to a current source of selected periods of time in accordance with a preset schedule in response to the detection of current by its sensing means;
i. load simulator means in said zone control unit for connecting a dummy load to said current source between the successive connections of valves thereto;
j. means in said zone control unit for closing its switching means in response to current from said current source; and
k. means in said central control unit for actuating said central pump in response to the detection of current by its sensing means.

10. In an irrigation system wherein water is supplied under pressure by means of a central pump to a plurality of remotely located valves, a pump and valve control system comprising in combination:
a. a central control unit;
b. a remotely located zone control unit;
c. a pair of wires connecting said units;
d. an alternating current source in said central control unit connected in series with one of said wires;
e. first and second sensing means in said central control unit for sensing current flow through said wires in a given direction, said first and second sensing means being responsive to current flow at first and second duty cycles respectively;
f. third sensing means in said zone control unit for sensing current flow through said wires in the opposite direction;
g. switching means in said central control unit for completing a circuit through said wires and through said third sensing means capable of carrying current only in the direction sensed by third sensing means;
h. second and third switching means in said zone control unit, each for completing a circuit independently of the other through said wires and through said first and second switching means for carrying current in the direction sensed by said first and second sensing means;
i. means in said central control unit for closing its switching means at selected hours of selected days;
j. means in said zone control unit for successively actuating selected ones of a set of valves for selected periods of time in accordance with a preset schedule in response to the detection of current by said third sensing means;
k. means in said zone control unit for closing said second switching means at said first duty cycle while any of said set of valves is being actuated;
l. means in said zone control unit for closing said third switching means at said second duty cycle while said schedule is in progress;
m. means in said central control unit for actuating said central pump in response to the detection of current by said first sensing means; and
n. means in said central control unit for producing an indication that said schedule is in progress in response to the detection of current by said second sensing means.

11. In a zone control unit for successively actuating selected ones of a plurality of valves for selected time intervals in response to an externally produced starting signal, the combination comprising:
a. switching means having a rest state, a plurality of intermediate states, and a plurality of outputs connected to cause power to be applied to respective ones of said valves during successive ones of said intermediate states;
b. stepping means for advancing by one the state of said switching means in response to successive control signals;
c. start signal sensing means for applying an initial control signal to said stepping means in response to one of said starting signals so as to cause said switching means to be advanced from its rest state to its first intermediate state; and
d. timing means for applying a delayed control signal to said stepping means in response to each advancement of said switching means to one of its intermediate states.

12. A zone control unit in accordance to claim 11 and further characterized in that
a. said switching means includes a multiposition rotary switch connected to apply power to respective ones of said valves in successive ones of its positions; and
b. said stepping means includes 1. an electric motor coupled to drive said rotary switch, and
2. means for applying power to said motor in response to a given control signal while said rotary switch is in a given one of its positions and continuing to apply power until said rotary switch reaches its next position.

13. The zone control unit of claim 11 characterized further by signal-blocking means for disabling said start signal sensing means when said switching means leaves its rest state in response to a given starting signal and for keeping said starting signal sensing means disabled so long as said given starting signal persists.

14. In a zone control unit for a set of valves wherein an externally generated starting signal causes selected ones of said set of valves to be actuated successively for individually selected time intervals during a first cycle, followed after a selected delay interval by a second cycle during which the successive actuation of said set of valves is repeated, the combination of:
   a. switching means having a rest position, a first series of valve positions, one position for each of said valves for controlling said first cycle, a delay position, and a second series of valve positions, one position for each of said valves for controlling said second cycle;
   b. means for actuating each of said valves while said switching means is in a position associated therewith;
   c. means for advancing said switching means in response to successive control signals;
   d. start signal sensing means for applying an initial control signal to said stepping means in response to one of said starting signals so as to cause said switching means to be advanced from its rest position to its first valve position; and
   e. timing means for applying an individually delayed control signal to said stepping means so as to advance it by one position a predetermined time after its advancement to each one of its valve and delay positions.

15. The zone control unit of claim 14 characterized further by the provision of means responsive to a moisture indication by a tensiometer only during said delay interval to apply a control signal to said control means of sufficient duration to return said switching means to its rest position.

16. In an electrically powered zone control unit for successively actuating selected ones of a plurality of valves for selected time intervals in response to an externally produced starting signal the combination comprising:
   a. electrical switching means having a rest state, a plurality of intermediate states, and a plurality of outputs connected to cause electric power to be applied to respective ones of said valves during successive ones of said intermediate states;
   b. means responsive to said starting signals for advancing said switching means from its rest state through successive ones of its intermediate states back to its rest state, leaving said switching means in each of its intermediate states for a selected time interval; and
   c. means responsive to the interruption and subsequent return of electric power to said zone control unit while said switching means is in one of said intermediate states for directly returning said switching means to its rest state.

PO-1050
(5/69)

UNITED STATES PATENT OFFICE
CERTIFICATE OF CORRECTION

Patent No. 3,599,867      Dated August 17, 1971

Inventor(s) David E. Griswold and Jonathan D. Likins

It is certified that error appears in the above-identified patent and that said Letters Patent are hereby corrected as shown below:

```
Column  3, line 53 "providing" should be --provided--;
Column  6, line 62 "value" should be --valve--;
Column  7, line 42 delete "a schematic" and insert --means--;
Column  9, line 75 "wipe" should be --wiper--;
Column 14, line 11 after "control" insert --unit--;
Column 15, line 64 "143" should be --243--;
Column 16, line 21 "of" (second occurrence) should be --or--;
Column 16, line 43 "n" should be --in--;
Column 16, line 59 "252" should be --242--;
Column 17, line 71 delete "of" (first occurrence);
Column 19, line 29 "the" should be --to a--;
Column 27, line 51 "We" should be --Is--;
Column 27, line 71 "sand" should be --and--;
Column 29, line 70 "of" (first occurrence) should be --for--.
```

Signed and sealed this 1st day of August 1972.

(SEAL)
Attest:

EDWARD M. FLETCHER, JR.      ROBERT GOTTSCHALK
Attesting Officer             Commissioner of Patents